United States Patent
Tang et al.

(10) Patent No.: US 9,432,973 B2
(45) Date of Patent: Aug. 30, 2016

(54) CONTROL CHANNEL RESOURCE ALLOCATION METHOD AND APPARATUS

(71) Applicant: Huawei Technologies Co., Ltd., Shenzhen, Guangdong (CN)

(72) Inventors: Zhenfei Tang, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 14/168,758

(22) Filed: Jan. 30, 2014

(65) Prior Publication Data

US 2014/0146720 A1    May 29, 2014

Related U.S. Application Data

(63) Continuation of application No. PCT/CN2012/075092, filed on May 4, 2012.

(30) Foreign Application Priority Data

Aug. 15, 2011 (CN) .......................... 2011 1 0233093
Jan. 5, 2012 (CN) .......................... 2012 1 0002032

(51) Int. Cl.
 H04W 72/04 (2009.01)
 H04L 5/14 (2006.01)
 H04L 5/00 (2006.01)

(52) U.S. Cl.
 CPC ........ *H04W 72/0406* (2013.01); *H04L 5/0055* (2013.01); *H04L 5/14* (2013.01); *H04W 72/042* (2013.01)

(58) Field of Classification Search
 CPC ....................... H04W 72/042; H04W 72/0406; H04W 72/0446; H04L 5/0055; H04L 5/14; H04L 5/0094; H04L 5/0091; H04L 1/0073
 See application file for complete search history.

(56) References Cited

U.S. PATENT DOCUMENTS 8,902,786 B2 * 12/2014 Nam ................. H04W 72/0406
                                                    370/252
9,072,083 B2 *  6/2015 Zhang .................. H04L 5/0007
(Continued)

FOREIGN PATENT DOCUMENTS

CN      101252783 A     8/2008
CN      101611584 A    12/2009
(Continued)

OTHER PUBLICATIONS

"3GPP TS 36.216—3$^{rd}$ Generation Partnership Project; Technical Specification Group Radio Access Network; Evolved Universal Terrestrial Radio Access (E-UTRA); Physical layer for relaying operation (Release 10)," Version 10.3.0, 3$^{rd}$ Generation Partnership Project, Valbonne, France (Jun. 2011).
(Continued)

*Primary Examiner* — Pao Sinkantarakorn
*Assistant Examiner* — Michael Phillips
(74) *Attorney, Agent, or Firm* — Leydig, Voit & Mayer, Ltd.

(57) ABSTRACT

Embodiments of the present invention disclose a control channel resource allocation method and apparatus, where the control channel resource allocation method includes: determining a VRB number corresponding to a first physical downlink control channel or a serial number of the first CCE for the first physical downlink control channel to transmit DCI, where the first physical downlink control channel includes an S-PDCCH or an R-PDCCH; and obtaining, according to the VRB number or the serial number of the first CCE, an offset, and a PUCCH parameter, a PUCCH format 1a or 1b resource number corresponding to the first physical downlink control channel.

12 Claims, 3 Drawing Sheets

(56) References Cited

U.S. PATENT DOCUMENTS

| | | | | |
|---|---|---|---|---|
| 2010/0098005 | A1* | 4/2010 | Lee | H04L 1/1861 370/329 |
| 2010/0195566 | A1* | 8/2010 | Krishnamurthy | H04L 5/0007 370/328 |
| 2010/0279628 | A1* | 11/2010 | Love | H04L 5/0091 455/70 |
| 2011/0032838 | A1* | 2/2011 | Liu | H04L 5/0032 370/252 |
| 2011/0194412 | A1* | 8/2011 | Park | H04L 5/0007 370/241 |
| 2011/0228724 | A1* | 9/2011 | Gaal | H04L 5/001 370/328 |
| 2011/0286406 | A1* | 11/2011 | Chen | H04L 1/1861 370/329 |
| 2012/0140726 | A1* | 6/2012 | Moon | H04B 7/155 370/329 |
| 2012/0201318 | A1* | 8/2012 | Seo | H04L 27/2607 375/260 |
| 2012/0320846 | A1* | 12/2012 | Papasakellariou | H04W 72/042 370/329 |
| 2013/0039284 | A1* | 2/2013 | Marinier | H04L 5/001 370/329 |
| 2013/0039291 | A1* | 2/2013 | Blankenship | H04L 5/001 370/329 |
| 2013/0064172 | A1* | 3/2013 | Park | H04L 1/1861 370/315 |
| 2014/0098780 | A1* | 4/2014 | Kim | H04J 11/0023 370/329 |
| 2014/0105155 | A1* | 4/2014 | Kim | H04L 1/1861 370/329 |
| 2014/0105191 | A1* | 4/2014 | Yang | H04L 1/1867 370/336 |

FOREIGN PATENT DOCUMENTS

| | | |
|---|---|---|
| CN | 101778419 A | 7/2010 |
| EP | 2736295 A1 | 5/2014 |
| WO | WO 2008092160 A2 | 7/2008 |
| WO | WO 2011093644 A2 | 8/2011 |

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.2.0, 3$^{rd}$ Generation Partnership Project, Valbonne, France (Jun. 2011).

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.2.0, 3$^{rd}$ Generation Partnership Project, Valbonne, France (Jun. 2011).

* cited by examiner

CONTROL CHANNEL RESOURCE ALLOCATION METHOD AND APPARATUS

CROSS-REFERENCE TO RELATED APPLICATIONS

This application is a continuation of International Patent Application No. PCT/CN2012/075092, filed on May 4, 2012, which claims priority to Chinese Patent Application No. 201110233093.9, filed on Aug. 15, 2011 and Chinese Patent Application No. 201210002032.6, filed on Jan. 5, 2012. The afore-mentioned patent applications are hereby incorporated by reference in their entireties.

TECHNICAL FIELD

The present invention relates to the field of communications technologies, and in particular, to a control channel resource allocation method and apparatus.

BACKGROUND

OFDMA (Orthogonal Frequency Division Multiplexing Access) is a downlink multiple access technology used by an LTE (Long Term Evolution, Long Term Evolution) system.

In an LTE system, a PDCCH (Physical Downlink Control Channel, physical downlink control channel) is used to allocate uplink and downlink resources to a UE (User Equipment, user equipment). For use of a PUCCH (Physical Uplink Control Channel, physical uplink control channel) format (format) 1a or 1b (which may also be represented as PUCCH format 1a/1b), a PUCCH format 1a or 1b resource number is related to the first CCE (Control Channel Element, control channel element) occupied by a corresponding PDCCH.

UE-specific reference signals can be used to demodulate a PDSCH and an R-PDCCH. For antenna ports 7-14, a reference signal sequence is defined as $$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases},$$

where c(i) is a quasi-random sequence, $N_{RB}^{max,DL}$ is the maximum system bandwidth, which equals 110. The quasi-random sequence c(i) is initialized as $c_{init}=(\lfloor n_s/2 \rfloor+1) \cdot (2N_{ID}^{cell}+1) \cdot 2^{16}+n_{SCID}$, where $n_s$ is a timeslot number, $N_{ID}^{cell}$ is a cell ID, and $n_{SCID}$ is a scrambling ID.

Because a PDCCH is mapped to several OFDM (Orthogonal Frequency Division Multiplexing) symbols at the beginning of a subframe, a capacity of the PDCCH is restricted by the quantity of OFDM symbols that bear a control channel In addition, PDCCHs are dispersively mapped to frequency resources. As a result, it is difficult to avoid interference of PDCCHs between cells. Therefore, an R-PDCCH (Relay Physical Downlink Control Channel, relay physical downlink control channel) is introduced for a relay link between an eNB (evolved Node B, evolved base station) and a Relay (relay). The R-PDCCH may be mapped to a data area and uses, like a PDSCH (Physical Downlink Shared Channel, physical downlink shared channel), an FDM (Frequency-division multiplexing, Frequency-division multiplexing) manner to avoid the interference by occupying different frequency resources, that is, virtual resource blocks. Furthermore, because the quantity of Relay nodes is relatively small, a PUCCH format 1a or 1b (which may also be represented as PUCCH format 1a or 1b (PUCCH format 1a or 1b)) resource number corresponding to the R-PDCCH can be configured by using higher layer signaling.

However, in a scenario in which the quantity of UEs is relatively large, the PUCCH format 1a or 1b resource number is still configured by using the higher layer signaling. This results in a waste of resources and results in control signaling overhead.

SUMMARY

Embodiments of the present invention provide a control channel resource allocation method and apparatus, so as to improve control channel resource allocation efficiency.

According to one aspect, an embodiment of the present invention provides a control channel resource allocation method, including:

determining a virtual resource block VRB number corresponding to a first physical downlink control channel, or determining a serial number of the first control channel element CCE for the first physical downlink control channel to transmit downlink control information DCI, where the first physical downlink control channel includes: a secondary physical downlink control channel S-PDCCH or a relay physical downlink control channel R-PDCCH; and obtaining, according to the VRB number corresponding to the first physical downlink control channel or the serial number of the first CCE for the first physical downlink control channel to transmit the DCI, an offset, and a physical uplink control channel PUCCH parameter, a PUCCH format 1a or 1b resource number corresponding to the first physical downlink control channel.

According to another aspect, an embodiment of the present invention provides a control channel resource allocation apparatus, including:

a determining unit, configured to determine a virtual resource block VRB number corresponding to a first physical downlink control channel, or determine a serial number of the first control channel element CCE for the first physical downlink control channel to transmit downlink control information DCI, where the first physical downlink control channel includes: a secondary physical downlink control channel S-PDCCH or a relay physical downlink control channel R-PDCCH; and an allocation unit, configured to obtain, according to the VRB number corresponding to the first physical downlink control channel or the serial number of the first CCE for the first physical downlink control channel to transmit the DCI, an offset, and a physical uplink control channel PUCCH parameter, a PUCCH format 1a or 1b resource number corresponding to the first physical downlink control channel.

As can be seen from the foregoing technical solutions provided in the embodiments of the present invention, it is unnecessary to allocate a resource of a PUCCH format 1a or 1b to a first physical downlink control channel in advance, it is unnecessary to configure a PUCCH format 1a or 1b resource number by using higher layer signaling, and when it is necessary to allocate the resource of the PUCCH format 1a or 1b to the first physical downlink control channel, a corresponding PUCCH format 1a or 1b resource number can be obtained according to a VRB number corresponding to the first physical downlink control channel or a serial number of the first CCE for the first physical downlink control channel to transmit DCI (Downlink Control Information, downlink control information), thereby saving higher layer signaling configuration and saving resources.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The following briefly describes related technologies involved in the embodiments of the present invention. In the embodiments of the present invention, an LTE system is used as an example. However, the present invention is not limited to the LTE system.

In the LTE system, from the point of view of time, a length of a wireless frame is 10 ms (millisecond), a wireless frame includes 10 subframes, and each subframe is 1 ms, and each subframe includes 2 timeslots; for a normal CP (Cyclic Prefix, cyclic prefix), each timeslot includes 7 OFDM symbols; or, for a extended CP, each timeslot includes 6 OFDM symbols. A subcarrier under an OFDM symbol on a frequency is an RE (Resource Element, resource element), and 12 subcarriers and a timeslot form an RB (Resource Block, resource block). A resource block is classified as a PRB (Physical Resource Block, physical resource block) and a VRB (Virtual Resource Block, virtual resource block), where the PRB refers to an actual frequency location of the resource block, and a mapping exists between the PRB and the VRB.

In the LTE system, a PDCCH is used for allocating uplink and downlink resources to a UE, and so on, and different transmission formats can be used to bear scheduling allocation information of different uplink channels or downlink channels. Scheduling allocation information of an uplink channel or a downlink channel is indicated by control information in a downlink control channel. After a control information bit is encoded by a channel, the control information bit is modulated by a symbol and mapped to physical downlink time-and-frequency resources. The physical time-and-frequency resources occupied by the PDCCH are allocated in the unit of CCE. The quantity of CCEs included in each PDCCH is called a CCE aggregation level (CCE aggregation level). The CCE aggregation level allowed in an LTE single-carrier system equals 1, 2, 4, or 8.

The LTE system uses an HARQ (Hybrid Automatic Repeat Request, hybrid automatic repeat request) to improve data transmission reliability. After a downlink HARQ is enabled, the UE decodes a received downlink data packet. If the downlink data packet is correct, an ACK (Acknowledgement, positive acknowledgement) is fed back to an eNB. If the downlink data packet is incorrect, a NACK (Negative Acknowledgement, negative acknowledgement) is fed back to an eNB to request the eNB to retransmit the data packet. The UE needs to use uplink control channel resources to send feedback information to the eNB over an uplink control channel, so as to complete the HARQ process.

For an ACK/NACK transmitted by using a PUCCH format 1a or 1b, the UE performing the feedback obtains, according to a serial number of a CCE occupied by downlink control information received through a PDCCH, a resource number used for performing ACK or NACK (ACK/NACK) feedback; that is, all PDCCHs are corresponding to resource numbers of available resources of a PUCCH format 1a or 1b.

The following briefly describes meanings of related parameters involved in the embodiments of the present invention:

$n_{VRB}$ Virtual resource block number (Virtual resource block number);

$n_{VRB}^{R-PDCCH}$ Virtual resource block number for R-PDCCH (Virtual resource block number for R-PDCCH); S-PDCCH $n_{VRB}^{S-PDCCH}$ Virtual resource block number for S-PDCCH (Virtual resource block number for S-PDCCH);

$N_{VRB}^{R-PDCCH}$ Quantity of VRBs configured for detecting R-PDCCH (Number of VRBs configured for detecting R-PDCCH);

$N_{VRB}^{S-PDCCH}$ Quantity of VRBs configured for detecting S-PDCCH (Number of VRBs configured for detecting S-PDCCH);

$N_{CCE}$ Quantity of CCEs of PDCCHs in one subframe in the system (Number of CCEs of PDCCHs in one subframe in the system);

$N_{CCE}^{R-PDCCH}$ Total quantity of CCEs in potential R-PDCCH channels in one timeslot or one subframe in a configured RB set (The total number of CCEs in the set of RBs configured for potential R-PDCCH transmission in one slot or one subframe);

$N_{CCE}^{S-PDCCH}$ Total quantity of CCEs in potential S-PDCCH channels in one timeslot or one subframe in a configured RB set (The total number of CCEs in the set of RBs configured for potential S-PDCCH transmission in one slot or one subframe);

$n^{CCE}$ Serial number of the first CCE for a PDCCH (that is, the smallest CCE index used to construct the PDCCH) to transmit the DCI (The serial number of the first CCE (that is, smallest CCE index used to construct the PDCCH) used for transmission of the corresponding DCI assignment);

$n_{CCE}^{R\text{-}PDCCH}$ Serial number of the first CCE of an R-PDCCH (The serial number of the first CCE for R-PDCCH);

$n_{CCE}^{S\text{-}PDCCH}$ Serial number of the first CCE of an S-PDCCH (The serial number of the first CCE for S-PDCCH);

$n_{PUCCH}^{(1,\tilde{p})}$ Resource index of PUCCH format 1a or 1b (Resource index for PUCCH formats 1a/1b);

$N_{RB}^{DL}$ Downlink bandwidth configuration (Downlink bandwidth configuration);

$N_{sc}^{RB}$ Resource block size in a frequency domain (Resource block size in the frequency domain);

$N_{offset}^{RS}$ Reference signal offset

Figure 1:
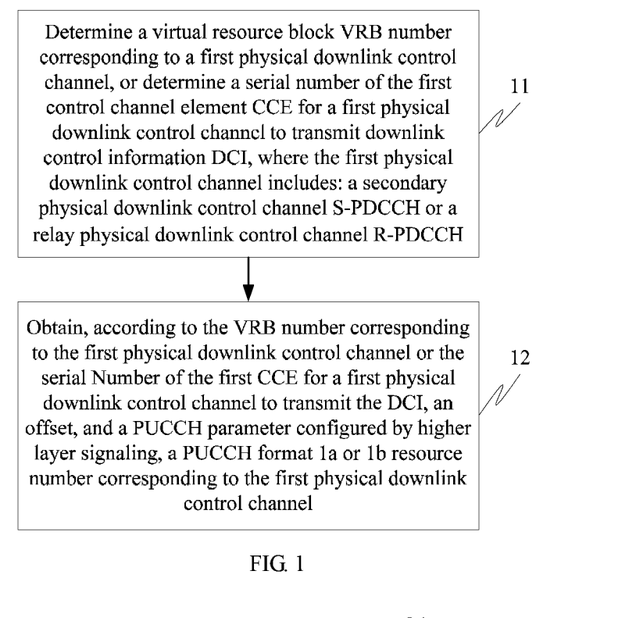
FIG. 1 is a first schematic flowchart of a control channel resource allocation method according to an embodiment of the present invention.

As shown in FIG. 1, an embodiment of the present invention provides a control channel resource allocation method, including:

11. Determine a virtual resource block VRB number corresponding to a first physical downlink control channel, or determine a serial number of the first control channel element CCE for the first physical downlink control channel to transmit downlink control information DCI, where the first physical downlink control channel includes: an S-PDCCH (Secondary Physical Downlink Control Channel, secondary physical downlink control channel) or a relay physical downlink control channel R-PDCCH.

12. Obtain, according to the VRB number corresponding to the first physical downlink control channel or the serial number of the first CCE for the first physical downlink control channel to transmit the DCI, an offset, and a PUCCH parameter, a PUCCH format 1a or 1b resource number corresponding to the first physical downlink control channel.

The control channel resource allocation method in this embodiment of the present invention may be executed by a UE or a base station (for example, an eNB in an LTE system). A UE may determine a PUCCH format 1a or 1b resource number according to the control channel resource allocation method in this embodiment of the present invention, and may send an HARQ-ACK (an ACK of an HARQ) over the resource, where the HARQ-ACK may bear an ACK/NACK and/or DTX (Discontinuous Transmission, discontinuous transmission). An eNB determines a physical uplink control channel PUCCH format 1a or 1b resource number of a UE according to the control channel resource allocation method in this embodiment of the present invention, and may receive, over a corresponding resource, an HARQ-ACK sent by a corresponding UE.

In an access link of the LTE system, an S-PDCCH is introduced, where the S-PDCCH has an R-PDCCH attribute and can be used for bearing the DCI sent to the UE. Furthermore, in the access link of the LTE system, the quantity of UEs is far more than the quantity of Relays in a relay link.

The PUCCH parameter $N_{PUCCH}^{(1)}$ may be configured by higher layer signaling. Configuring the PUCCH parameter $N_{PUCCH}^{(1)}$ by using the higher layer signaling is the prior art, and therefore no details are described herein again.

As can be seen from the foregoing technical solution provided in this embodiment of the present invention, it is unnecessary to allocate a resource of a PUCCH format 1a or 1b to a first physical downlink control channel in advance, it is unnecessary to configure a PUCCH format 1a or 1b resource number by using higher layer signaling, and when it is necessary to allocate the resource of the PUCCH format 1a or 1b to the first physical downlink control channel, a corresponding PUCCH format 1a or 1b resource number can be obtained according to a VRB number corresponding to the first physical downlink control channel or a serial number of the first CCE for the first physical downlink control channel to transmit DCI, thereby saving higher layer signaling configuration and saving resources.

In this embodiment of the present invention, the obtaining, according to the VRB number corresponding to the first physical downlink control channel, an offset, and a PUCCH parameter, a PUCCH format 1a or 1b resource number corresponding to the first physical downlink control channel may include:

adding the offset to the VRB number corresponding to the first physical downlink control channel and then adding the PUCCH parameter, so as to obtain the PUCCH format 1a or 1b resource number corresponding to the first physical downlink control channel; or adding the offset to the VRB number corresponding to the first physical downlink control channel, so as to obtain a serial number of the first CCE for a PDCCH to transmit the DCI corresponding to the first physical downlink control channel; and adding the PUCCH parameter to the serial number of the first CCE for of the PDCCH to transmit the DCI, so as to obtain the PUCCH format 1a or 1b resource number corresponding to the first physical downlink control channel.

A value range of the PUCCH parameter $N_{PUCCH}^{(1)}$ may be 0-2047.

As can be seen, the offset is added to the VRB number corresponding to the first physical downlink control channel, so as to obtain the number $n_{CCE}$ of the first CCE for the PDCCH corresponding to the first physical downlink control channel to transmit the DCI, and the PUCCH format 1a or 1b resource number $n_{PUCCH}^{(1,\tilde{p})}$ may further be obtained through $n_{CCE}$, so that a system changes little, and can be compatible with the PDCCH.

Furthermore, because the offset and the PUCCH parameter $N_{PCCH}^{(1)}$ are added, the PUCCH format 1a or 1b resource number corresponding to the first physical downlink control channel is an offset of a PUCCH format 1a or 1b resource number corresponding to the PDCCH. Specifically, a PUCCH format 1a or 1b resource set corresponding to the first physical downlink control channel follows a PUCCH format 1a or 1b resource set corresponding to the PDCCH, thereby avoiding a collision between a resource corresponding to the first physical downlink control channel and a resource corresponding to another PDCCH.

Optionally, in an FDD (Frequency Division Duplexing, frequency division duplexing) system, when the first physical downlink control channel does not use cross-interleaving:

the offset includes a first offset, where the first offset at least includes the total quantity $N^{CCE}$ of CCEs of the PDCCH in one subframe, or the first offset at least includes a first physical downlink control channel parameter, where the first physical downlink control channel parameter may include an offset $N_{S\text{-}PDCCH}^{(1)}$ that indicates S-PDCCH resource allocation, or may include an offset $N_{R\text{-}PDCCH}^{(1)}$ that indicates R-PDCCH resource allocation, $N_{S\text{-}PDCCH}^{(1)}$ or $N_{R\text{-}PDCCH}^{(1)}$ may be notified to the UE by higher layer signaling, a value range of $N_{S\text{-}PDCCH}^{(1)}$ may be 0-2047, and a value range of $N_{R\text{-}PDCCH}^{(1)}$ may be 0-2047.

In the FDD system, when the first physical downlink control channel does not use the cross-interleaving, a manner for determining the VRB serial number of the first physical downlink control channel may include:

if a group of VRBs or multiple groups of VRBs are configured for the first physical downlink control channel, VRBs included in the multiple groups of VRBs are numbered sequentially, VRBs included in a same group of VRBs are numbered consecutively, and a VRB corresponding to the first physical downlink control channel can be determined in the group or the multiple groups of VRBs, the VRB number corresponding to the first physical downlink control channel can be determined.

As can be seen, in the group or the multiple groups of VRBs, the base station selects a VRB aggregation level, then selects a VRB resource, determines a VRB resource number, and then maps and sends a first physical layer downlink control channel corresponding to the UE over the selected VRB resource. Correspondingly, the UE may detect, in the group or the multiple groups of VRBs, the VRB number corresponding to the first physical downlink control channel Optionally, in a TDD (Time Division Duplexing, time division duplexing) system, when the first physical downlink control channel does not use cross-interleaving:

the offset includes the sum of the total quantity $N_{CCE,all}^{PDCCH}$ of CCEs of the PDCCH in M subframes and a second offset $N_{offset}$, where the M subframes are downlink subframes corresponding to uplink subframes for feeding back a positive acknowledgement ACK or a negative acknowledgement NACK, and M is an integer greater than or equal to 1.

Optionally, in the TDD system, when the first physical downlink control channel does not use the cross-interleaving, a manner for determining the total quantity $N_{CCE,all}^{PDCCH}$ of CCEs that are in the M subframes and corresponding to the PDCCH may include:

determining the quantity $N_{CCE,max}^{PDCCH}$ of CCEs that is corresponding to the maximum physical control format indicator channel PCFICH value owned in the M subframes, or determining the quantity $N_{CCE,max}^{PDCCH}$ of or CCEs that is corresponding to a specified PCFICH value.

M may be understood through the following Table 1.

PCFICH value is 3, the specified quantity $N_{CCE,max}^{PDCCH}$ of CCEs is the quantity of CCEs that is corresponding to the case when the PCFICH value is 3.

TABLE 2

Quantity of OFDM symbols for transmission of a PDCCH

| Subframe | Quantity of OFDM symbols for transmission of a PDCCH when $N_{RB}^{DL} > 10$ | Quantity of OFDM symbols for transmission of a PDCCH when $N_{RB}^{DL} \leq 10$ |
| --- | --- | --- |
| Subframes 1 and 6 in frame structure 2 | 1, 2 | 2 |
| MBSFN (Multicast Broadcast Single Frequency Network) subframe on a carrier supporting a PDSCH when cell-specific antenna ports are configured to 1 or 2 | 1, 2 | 2 |
| MBSFN subframe on a carrier supporting a PDSCH when cell-specific antenna ports are configured to 4 | 2 | 2 |
| Subframe on a carrier not supporting a PDSCH | 0 | 0 |
| Non-MBSFN subframe (except subframe 6 in frame structure 2) for which a PRS is configured | 1, 2, 3 | 2, 3 |
| All other cases | 1, 2, 3 | 2, 3, 4 |

Optionally, in the TDD system, when the first physical downlink control channel does not use the cross-interleaving, a manner for determining the second offset $N_{offset}$ may include:

when a PUCCH corresponding to the first physical downlink control channel in the M subframes uses a block

TABLE 1

Downlink association set index (Downlink association set index) K: {k₀, k₁, . . . k_{m−1}} for a TDD system

| Uplink-downlink Configuration (UL-DL Configuration) | Subframe (subframe) n | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Exemplarily, for example, when a subframe number is 2, an uplink-downlink configuration ratio is 2, and as can be seen according to Table 1, K: {k₀, k₁, . . . k_{m-1}} is {8, 7, 4, 6}, so that the value of M is 4.

The PCFICH value may be understood as the quantity of OFDM symbols for transmission of a PDCCH. The quantity $N_{CCE,max}^{PDCCH}$ of CCEs that is corresponding to the specified PCFICH value may be understood that, in a certain case in Table 2, when the PCFICH value is the maximum value, the quantity of CCEs that is corresponding to the maximum value is the specified $N_{CCE,max}^{PDCCH}$. A manner for obtaining a corresponding quantity of CCEs by using the PCFICH value is the prior art, and therefore no details are described herein again.

Exemplarily, for example, in "all other cases" shown in the following Table 2, when $N_{RB}^{DL} > 10$, and the maximum cross-interleaving mode, a cross-interleaving block size is $N_c$, and $N_c$ is the quantity of CCEs that is corresponding to an Orthogonal Frequency Division Multiplexing Access OFDM symbol, determining the second offset by $N_{offset} = (M-m-1) \cdot N_c + m \cdot N_{c+1}$, where c is selected from a set {0, 1, 2, 3}, c satisfies $N_c \leq n_{VRB}^{S-PDCCH} < N_{c+1}$ or satisfies $N_c \leq n_{VRB}^{R-PDCCH} < N_{c+1}$, and $N_c = \max\{0, \lfloor [N_{RB}^{DL} \cdot (N_{sc}^{RB} \cdot c - 4)]/36 \rfloor \}$; or when a PUCCH corresponding to the first physical downlink control channel in the M subframes uses a block cross-interleaving mode and a cross-interleaving block size is $N_c$, determining the second offset by $N_{offset} = (M-m-1) \cdot c \cdot N_c + m \cdot (c+1) \cdot N_c$, where c is selected from a set {0, 1, 2, 3}, c satisfies $c \cdot N_c \leq n_{VRB}^{S-PDCCH} < (c+1) \cdot N_c$ or satisfies $c \cdot N_c \leq n_{VRB}^{R-PDCCH} < (c+1) \cdot N_c$, and $N_c$ is parameter configured by using higher layer signaling;

where, M is an integer greater than or equal to 1, m is a subframe number of a subframe that is among the M subframes and to which the first physical downlink control channel belongs, $N_{RB}^{DL}$ is downlink bandwidth configuration, $N_{sc}^{RB}$ is a resource block size in a frequency domain, $n_{VRB}^{S-PDCCH}$ is a VRB number corresponding to an S-PDCCH, and $n_{VRB}^{R-PDCCH}$ is a VRB number corresponding to an R-PDCCH.

In this embodiment of the present invention, the obtaining, according to the serial number of the first CCE for the first physical downlink control channel to transmit the DCI, an offset, and a PUCCH parameter, a PUCCH format 1a or 1b resource number corresponding to the first physical downlink control channel may include:

adding the offset to the serial number of the first CCE for the first physical downlink control channel to transmit the DCI and then adding the PUCCH parameter, so as to obtain the PUCCH format 1a or 1b resource number corresponding to the first physical downlink control channel; or adding the offset to the serial number of the first CCE for the first physical downlink control channel to transmit the DCI, so as to obtain a serial number of the first CCE for a PDCCH corresponding to the first physical downlink control channel to transmit the DCI; and adding the PUCCH parameter to the serial number of the first CCE for the PDCCH to transmit the DCI, so as to obtain the PUCCH format 1a or 1b resource number corresponding to the first physical downlink control channel A value range of the PUCCH parameter $N_{PUCCH}^{(1)}$ may be 0-2047.

Optionally, in an FDD system, when the first physical downlink control channel uses cross-interleaving:

the offset includes a third offset, where the third offset includes the total quantity $N_{CCE}$ of CCEs that are in one subframe and corresponding to the PDCCH, or the third offset includes a first physical downlink control channel parameter, where the first physical downlink control channel parameter may include an offset $N_{S-PDCCH}^{(1)}$ that indicates S-PDCCH resource allocation, or may include an offset $N_{R-PDCCH}^{(1)}$ that indicates R-PDCCH resource allocation, $N_{S-PDCCH}^{(1)}$ or $N_{R-PDCCH}^{(1)}$ may be notified to the UE by higher layer signaling, a value range of $N_{S-PDCCH}^{(1)}$ may be 0-2047, and a value range of $N_{R-PDCCH}^{(1)}$ may be 0-2047.

In the FDD system, when the first physical downlink control channel does not use the cross-interleaving, a manner for determining the serial number of the first CCE for the first physical downlink control channel to transmit the DCI may include:

if a group of VRBs or multiple groups of VRBs are configured for the first physical downlink control channel, each group of VRBs includes multiple CCEs, CCEs in the multiple groups of VRBs are numbered sequentially, and CCEs in a same group of VRBs are numbered consecutively, determining, in the group or the multiple groups of VRBs, the serial number of the first CCE for the first physical downlink control channel to transmit the DCI.

Optionally, in a TDD system, when the first physical downlink control channel uses cross-interleaving:

the offset includes the sum of the total quantity $N_{CCE,all}^{PDCCH}$ of CCEs of the PDCCH in M subframes and a fourth offset $N_{offset}$, where the M subframes are downlink subframes corresponding to uplink subframes for feeding back a positive acknowledgement ACK or a negative acknowledgement NACK, and M is greater than or equal to 1.

In the TDD system, when the first physical downlink control channel does not use the cross-interleaving, a manner for determining the total quantity $N_{CCE,all}^{PDCCH}$ of CCEs that are in the M subframes and corresponding to the PDCCH may include:

determining the quantity $N_{CCE,max}^{PDCCH}$ of CCEs that is corresponding to the maximum physical control format indicator channel PCFICH value owned in the M subframes, or determining the quantity $N_{CCE,max}^{PDCCH}$ of CCEs that is corresponding to a specified PCFICH value; and obtaining, according to $N_{CCE,all}^{PDCCH}=M\cdot N_{CCE,max}^{PDCCH}$, the total quantity $N_{CCE,all}^{PDCCH}$ of CCEs that are in the M subframes and corresponding to the PDCCH.

In the TDD system, when the first physical downlink control channel does not use the cross-interleaving, a manner for determining the fourth offset $N_{offset}$ may include:

when a PUCCH corresponding to the first physical downlink control channel in the M subframes does not use a block cross-interleaving mode, determining the fourth offset by $N_{offset}=m\cdot N_{CCE,max}^{S-PDCCH}$ or $N_{offset}=m\cdot N_{CCE,max}^{R-PDCCH}$, where $N_{CCE,max}^{S-PDCCH}$ is the quantity of CCEs that is corresponding to all S-PDCCHs in a subframe to which the first physical downlink control channel belongs, $N_{CCE,max}^{R-PDCCH}$ is the quantity of CCEs that is corresponding to all R-PDCCHs in the subframe to which the first physical downlink control channel belongs, and $N_{offset}=m\cdot N_{CCE,max}^{R-PDCCH}$; or when a PUCCH corresponding to the first physical downlink control channel in the M subframes uses a block cross-interleaving mode, a cross-interleaving block size is $N_c$, and $N_c$ is the quantity of CCEs that is corresponding to an OFDM symbol, determining the fourth offset by $N_{offset}=(M-m-1)\cdot N_c + m\cdot N_{c+1}$, where c is selected from a set {0, 1, 2, 3}, c satisfies $N_c \leq n_{CCE}^{S-PDCCH} < N_{c+1}$ or satisfies $N_c \leq n_{CCE}^{R-PDCCH} < N_{c+1}$, and $N_c = \max\{0, \lfloor N_{RB}^{DL} \cdot (N_{sc}^{RB} \cdot c - 4)]/36 \rfloor\}$; or when a PUCCH corresponding to the first physical downlink control channel in the M subframes uses a block cross-interleaving mode and a cross-interleaving block size is $N_c$, determining the fourth offset by $N_{offset}=(M-m-1)\cdot c \cdot N_c$, where c is selected from a set {0, 1, 2, 3}, c satisfies $c\cdot N_c \leq n_{CCE}^{S-PDCCH} < (c+1)\cdot N_c$ or satisfies $c\cdot N_c \leq n_{CCE}^{R-PDCCH} < (c+1)\cdot N_c$, and $N_c$ is a higher layer signaling configuration parameter;

where, M is greater than or equal to 1, m is a subframe number of a subframe that is among the M subframes and to which the first physical downlink control channel belongs, $N_{RB}^{DL}$ is downlink bandwidth configuration, $N_{sc}^{RB}$ is a resource block size in a frequency domain, $n_{CCE}^{S-PDCCH}$ is a serial number of the first CCE for an S-PDCCH to transmit the DCI, and $n_{CCE}^{R-PDCCH}$ is a serial number of the first CCE for an R-PDCCH to transmit the DCI.

M may be understood through Table 1, and the quantity $N_{CCE,max}^{PDCCH}$ CCEs that is corresponding to the specified PCFICH value may be understood through Table 2, and therefore no details are described herein again.

Optionally, the offset may include a reference signal offset $N_{offset}^{RS}$, where the reference signal offset $N_{offset}^{RS}$ may be determined by an antenna port p of a UE-specific reference signal (UE-specific reference signal) supporting S-PDCCH or R-PDCCH transmission. In an embodiment of the present invention, when the quantity of antenna ports of the UE-specific reference signal supporting the S-PDCCH or R-PDCCH transmission is equal to 1, where the antenna ports are allocated to the UE, the reference signal offset $N_{offset}^{RS}$ may be determined by the antenna port p. In another embodiment of the present invention, when the quantity of antenna ports of the UE-specific reference signal supporting the S-PDCCH or R-PDCCH transmission exceeds 1, where the antenna ports are allocated to the UE, the reference signal offset $N_{offset}^{RS}$ may also be determined by the antenna port p that is among the antenna ports of the UE-specific reference signal supporting the S-PDCCH or R-PDCCH transmission and whose antenna port number is the smallest. A person skilled in the art may understand that, p may represent an antenna port, p may also represent an antenna port number (antenna port index) of the antenna port, and this is not limited in the present invention.

Optionally, a method for determining the reference signal offset $N_{offset}^{RS}$ may be: $N_{offset}^{RS}=p-7$, where p can be selected from any one of the following sets: p∈{7}, p∈{7,8}, p∈{7,8,9,10}, and p∈{7,8,9,10,11,12,13,14}. For example, when the quantity of antenna ports of the UE-specific reference signal supporting the S-PDCCH or R-PDCCH transmission exceeds 1, where the antenna ports are allocated to the UE, the reference signal offset $N_{offset}^{RS}$ may be 7.

Optionally, the antenna port p of the UE-specific reference signals may be notified by the base station to the UE by sending signaling, where the information may be radio resource control RRC signaling, explicit physical layer signaling, or implicit physical layer signaling.

Optionally, in an FDD system, when the first physical downlink control channel does not use cross-interleaving, the offset includes the sum of a first offset and the reference signal offset $N_{offset}^{RS}$.

Optionally, in a TDD system, when the first physical downlink control channel does not use cross-interleaving, the offset includes the sum of the total quantity $N_{CCE,all}^{PDCCH}$ of CCEs of the PDCCH in M subframes, a second offset $N_{offset}$, and the reference signal offset $N_{offset}^{RS}$.

Optionally, in an FDD system, when the first physical downlink control channel uses cross-interleaving, the offset includes the sum of a third offset and the reference signal offset $N_{offset}^{RS}$.

Optionally, in a TDD system, when the first physical downlink control channel uses cross-interleaving, the offset includes the sum of the total quantity $N_{CCE,all}^{PDCCH}$ of CCEs of the PDCCH in M subframes, a fourth offset $N_{offset}$, and the reference signal offset $N_{offset}^{RS}$.

Optionally, the offset may include a reference signal offset $N_{offset}^{RS}$, where the reference signal offset $N_{offset}^{RS}$ may also be determined by a quasi-random sequence initialization parameter of a reference signal sequence supporting S-PDCCH or R-PDCCH transmission. In an embodiment of the present invention, the quasi-random sequence initialization parameter of the reference signal sequence supporting the S-PDCCH or R-PDCCH transmission includes X or $n_{SCID}$ in a quasi-random sequence initialization formula $c_{init}=(\lfloor n_s/2 \rfloor+1)\cdot(2X+1)\cdot 2^{16}+n_{SCID}$, that is, $N_{offset}^{RS}=n_{SCID}$ or $N_{offset}^{RS}=X \mod K$. The mod here indicates a modulo operation; X may be a cell ID whose value is in a certain range, for example, it may be any value from 0 to 503; $n_{SCID}$ may be a scrambling ID whose value is in a certain range, for example, it may be 0 or 1; and K may be any value among values 2, 4, 8, and the like.

Optionally, the value of X or $n_{SCID}$ may be notified by the base station to the UE by sending signaling, where the information may be radio resource control RRC signaling, explicit physical layer signaling, or implicit physical layer signaling.

Optionally, in an FDD system, when the first physical downlink control channel does not use cross-interleaving, the offset includes the sum of a first offset and the reference signal offset $N_{offset}^{RS}$.

Optionally, in a TDD system, when the first physical downlink control channel does not use cross-interleaving, the offset includes the sum of the total quantity $N_{CCE,all}^{PDCCH}$ of CCEs of the PDCCH in M subframes, a second offset $N_{offset}$, and the reference signal offset $N_{offset}^{RS}$.

Optionally, in an FDD system, when the first physical downlink control channel uses cross-interleaving, the offset includes the sum of a third offset and the reference signal offset $N_{offset}^{RS}$.

Optionally, in a TDD system, when the first physical downlink control channel uses cross-interleaving, the offset includes the sum of the total quantity $N_{CCE,all}^{PDCCH}$ of CCEs of the PDCCH in M subframes, a fourth offset $N_{offset}$, and the reference signal offset $N_{offset}^{RS}$.

As can be seen from the foregoing technical solution provided in the present invention, according to the control channel resource allocation method in this embodiment of the present invention, higher layer signaling may not be required to notify a resource of a PUCCH format 1a or 1b of each UE, thereby saving higher layer signaling. In addition, it is also unnecessary to reserve a resource of a PUCCH format 1a or 1b for a UE, and the resource of the PUCCH format 1a or 1b is allocated only when scheduling is performed, that is, when a PDSCH indicated by an S-PDCCH or an R-PDCCH exists, so that the resource can be used efficiently.

Furthermore, according to the technical solution provided in this embodiment of the present invention, because the offset and the PUCCH parameter $N_{PUCCH}^{(1)}$ are added, the PUCCH format 1a or 1b resource number corresponding to the first physical downlink control channel is an offset of a PUCCH format 1a or 1b resource number corresponding to the PDCCH. Specifically, a PUCCH format 1a or 1b resource set corresponding to the first physical downlink control channel follows a PUCCH format 1a or 1b resource set corresponding to the PDCCH, thereby avoiding a collision between a resource corresponding to the first physical downlink control channel and a resource corresponding to another PDCCH.

It should be noted that, in the control channel resource allocation method in this embodiment of the present invention, when a base station and a UE obtain a value of a corresponding physical uplink control channel PUCCH format 1a or 1b resource number according to a VRB number corresponding to the first physical downlink control channel, used calculation methods need to be consistent.

An LTE system may be used as an example in the control channel resource allocation method provided in this embodiment of the present invention, and the method is implemented in the LTE system. In addition, a person skilled in the art may understand that, the control channel resource allocation method in this embodiment of the present invention may also be applied to an LTE-A (LTE-Advanced, LTE-Advanced) system and a subsequent evolved system of the LTE technology and this is not limited.

Figure 2:
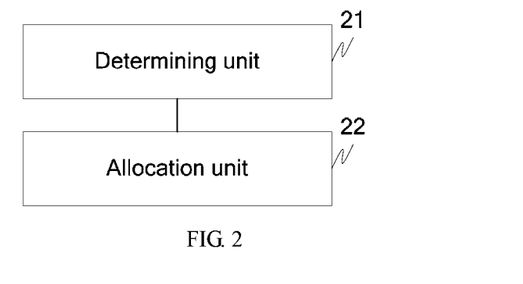
FIG. 2 is a first schematic structural diagram of a control channel resource allocation apparatus according to an embodiment of the present invention.

As shown in FIG. 2, an embodiment of the present invention provides a control channel resource allocation apparatus for corresponding to the control channel resource allocation method in the foregoing embodiment, and the apparatus includes:

a determining unit 21, configured to determine a virtual resource block VRB number corresponding to a first physical downlink control channel, or determine a serial number of the first control channel element CCE for a first physical downlink control channel to transmit downlink control information DCI, where the first physical downlink control channel includes a secondary physical downlink control channel S-PDCCH or a relay physical downlink control channel R-PDCCH; and an allocation unit 22, configured to obtain, according to the VRB number corresponding to the first physical downlink control channel or the serial number of the first CCE for the first physical downlink control channel to transmit the DCI, an offset, and a PUCCH parameter, a PUCCH format 1a or 1b resource number corresponding to the first physical downlink control channel The control channel resource allocation apparatus in this embodiment of the present invention may be arranged independently or integrated with a UE, or the control channel resource allocation apparatus in this embodiment of the present invention may be a UE. Optionally, the control channel resource allocation apparatus in this embodiment of the present invention may be arranged independently or integrated with a base station, or the control channel resource allocation apparatus in this embodiment of the present invention may be a base station, for example, an eNB in an LTE system.

As can be seen from the foregoing technical solution provided in this embodiment of the present invention, it is unnecessary to allocate a resource of a PUCCH format 1a or 1b to a first physical downlink control channel in advance, it is unnecessary to configure a PUCCH format 1a or 1b resource number by using higher layer signaling, and when it is necessary to allocate the resource of the PUCCH format 1a or 1b to the first physical downlink control channel, a corresponding PUCCH format 1a or 1b resource number can be obtained according to a VRB number corresponding to the first physical downlink control channel or a serial number of the first CCE for the first physical downlink control channel transmit DCI, thereby saving higher layer signaling configuration and saving resources.

Optionally, the allocation unit 22 may be specifically configured to: add the offset to the VRB number corresponding to the first physical downlink control channel and then add the PUCCH parameter, so as to obtain the PUCCH format 1a or 1b resource number corresponding to the first physical downlink control channel; or, add the offset to the VRB number corresponding to the first physical downlink control channel, so as to obtain a serial number of the first CCE for a PDCCH corresponding to the first physical downlink control channel to transmit the DCI, and add the PUCCH parameter to the serial number of the first CCE for the PDCCH to transmit the DCI, so as to obtain the PUCCH format 1a or 1b resource number corresponding to the first physical downlink control channel A value range of the PUCCH parameter $N_{PUCCH}^{(1)}$ may be 0-2047.

Optionally, in an FDD system, when the first physical downlink control channel does not use cross-interleaving:

the offset includes a first offset, where the first offset at least includes the total quantity $N_{CCE}$ of CCEs that are in one subframe and corresponding to the PDCCH, or the first offset at least includes a first physical downlink control channel parameter, where the first physical downlink control channel parameter may include an offset $N_{S-PDCCH}^{(1)}$ that indicates S-PDCCH resource allocation, or may include an offset $N_{R-PDCCH}^{(1)}$ that indicates R-PDCCH resource allocation, $N_{S-PDCCH}^{(1)}$ or $N_{R-PDCCH}^{(1)}$ may be notified to the UE by higher layer signaling, a value range of $N_{S-PDCCH}^{(1)}$ may be 0-2047, and a value range of $N_{R-PDCCH}^{(1)}$ may be 0-2047.

In the FDD system, when the first physical downlink control channel does not use the cross-interleaving, the determining unit 21 may be specifically configured to: if a group of VRBs or multiple groups of VRBs are configured for the first physical downlink control channel, VRBs included in the multiple groups of VRBs are numbered sequentially, and VRBs included in a same group of VRBs are numbered consecutively, determine, in the group or the multiple groups of VRBs, the VRB number corresponding to the first physical downlink control channel.

Optionally, in a TDD system, when the first physical downlink control channel does not use cross-interleaving, and when the first physical downlink control channel does not use cross-interleaving:

the offset includes the sum of the total quantity $N_{CCE,all}^{PDCCH}$ of CCEs of the PDCCH in M subframes and a second offset $N_{offset}$, where the M subframes are downlink subframes corresponding to uplink subframes for feeding back a positive acknowledgement ACK or a negative acknowledgement NACK, and M is an integer greater than or equal to 1.

In the TDD system, when the first physical downlink control channel does not use the cross-interleaving, the determining unit 21 may be further specifically configured to determine the quantity $N_{CCE,max}^{PDCCH}$ of CCEs that is corresponding to the maximum physical control format indicator channel PCFICH value owned in the M subframes, or determine the quantity $N_{CCE,max}^{PDCCH}$ of CCEs that is corresponding to a specified PCFICH value; and obtain, according to $N_{CCE,all}^{PDCCH}=M \cdot N_{CCE,max}^{PDCCH}$, the total quantity $N_{CCE,all}^{PDCCH}$ of CCEs that are in the M subframes and corresponding to the PDCCH.

In the TDD system, when the first physical downlink control channel does not use the cross-interleaving, the determining unit 21 may be further specifically configured to: when a PUCCH corresponding to the first physical downlink control channel in the M subframes uses a block cross-interleaving mode, a cross-interleaving block size is $N_c$, and $N_c$ is the quantity of CCEs that is corresponding to an OFDM symbol, determine the second offset by $N_{offset}=(M-m-1) \cdot N_c + m \cdot N_{c+1}$, where c is selected from a set {0, 1, 2, 3}, c satisfies $N_c \leq n_{VRB}^{S-PDCCH} < N_{c+1}$ or satisfies $N_c = n_{VRB}^{R-PDCCH} < N_{c+1}$, and $N_c = \max\{0, \lfloor [N_{RB}^{DL} \cdot (N_{sc}^{RB} \cdot c - 4)]/36 \rfloor\}$; or or when a PUCCH corresponding to the first physical downlink control channel in the M subframes uses a block cross-interleaving mode and a cross-interleaving block size is $N_c$, determine the second offset by $N_{offset}=(M-m-1) \cdot c \cdot N_c + m \cdot (c+1) \cdot N_c$, where c is selected from a set {0, 1, 2, 3}, c satisfies $c \cdot N_c \leq n_{VRB}^{S-PDCCH} < (c+1) \cdot N_c$ or satisfies $c \cdot N_c \leq n_{VRB}^{R-PDCCH} < (c+1) \cdot N_c$, and $N_c$ is a higher layer signaling configuration parameter;

where, M is greater than or equal to 1, m is a subframe number of a subframe that is among the M subframes and to which the first physical downlink control channel belongs, $N_{RB}^{DL}$ is downlink bandwidth configuration, $N_{sc}^{RB}$ is a resource block size in a frequency domain, $n_{VRB}^{S-PDCCH}$ is a VRB number corresponding to an S-PDCCH, and $n_{VRB}^{R-PDCCH}$ is a VRB number corresponding to an R-PDCCH.

Optionally, the allocation unit 22 may be specifically configured to: add the offset to the serial number of the first CCE for the first physical downlink control channel to transmit the DCI and then add the PUCCH parameter, so as to obtain the PUCCH format 1a or 1b resource number corresponding to the first physical downlink control channel; or, add the offset to the serial number of the first CCE for the first physical downlink control channel to transmit the DCI, so as to obtain a serial number of the first CCE for a PDCCH corresponding to the first physical downlink control channel to transmit the DCI, and add the PUCCH parameter to the serial number of the first CCE for the PDCCH to transmit the DCI, so as to obtain the PUCCH format 1a or 1b resource number corresponding to the first physical downlink control channel A value range of the PUCCH parameter $N_{PUCCH}^{(1)}$ may be 0-2047.

Optionally, in an FDD system, when the first physical downlink control channel uses cross-interleaving:

the offset includes a third offset, where the third offset includes the total quantity $N_{CCE}$ of CCEs that are in one subframe and corresponding to the PDCCH, or the third offset includes a first physical downlink control channel parameter.

In the FDD system, when the first physical downlink control channel uses the cross-interleaving, the determining unit 21 may be specifically configured to: if a group of VRBs or multiple groups of VRBs are configured for the first physical downlink control channel, each group of VRBs includes multiple CCEs, CCEs in the multiple groups of VRBs are numbered sequentially, and CCEs in a same group of VRBs are numbered consecutively, determine, in the group or the multiple groups of VRBs, the serial number of the first CCE for the first physical downlink control channel to transmit the DCI.

Optionally, in a TDD system, when the first physical downlink control channel uses cross-interleaving, and when the first physical downlink control channel uses cross-interleaving:

the offset includes the sum of the total quantity $N_{CCE,all}^{PDCCH}$ of CCEs of the PDCCH in M subframes and a fourth offset $N_{offset}$, where the M subframes are downlink subframes corresponding to uplink subframes for feeding back a positive acknowledgement ACK or a negative acknowledgement NACK, and M is an integer greater than or equal to 1.

In the TDD system, when the first physical downlink control channel uses the cross-interleaving, the determining unit 21 may be further specifically configured to determine the quantity $N_{CCE,max}^{PDCCH}$ of CCEs that is corresponding to the maximum physical control format indicator channel PCFICH value owned in the M subframes, or determine the quantity $N_{CCE,max}^{PDCCH}$ of CCEs that is corresponding to a specified PCFICH value; and obtain, according to $N_{CCE,all}^{PDCCH}=M\cdot N_{CCE,max}^{PDCCH}$, the total quantity $N_{CCE,all}^{PDCCH}$ of CCEs that are in the M subframes and corresponding to the PDCCH.

In the TDD system, when the first physical downlink control channel uses the cross-interleaving, the determining unit 21 may be further specifically configured to: when a PUCCH corresponding to the first physical downlink control channel in the M subframes does not use a block cross-interleaving mode, determine the fourth offset by $N_{offset}=m\cdot N_{CCE,max}^{S-PDCCH}$ or $N_{offset}=m\cdot N_{CCE,max}^{R-PDCCH}$, where $N_{CCE,max}^{S-PDCCH}$ is the quantity of CCEs that is corresponding to all S-PDCCHs in a subframe to which the first physical downlink control channel belongs, $N_{CCE,max}^{R-PDCCH}$ is the quantity of CCEs that is corresponding to all R-PDCCHs in the subframe to which the first physical downlink control channel belongs, and $N_{offset}=m\cdot N_{CCE,max}^{R-PDCCH}$; or when a PUCCH corresponding to the first physical downlink control channel in the M subframes uses a block cross-interleaving mode, a cross-interleaving block size is $N_c$, and $N_c$ is the quantity of CCEs that is corresponding to an OFDM symbol, determine the fourth offset by $N_{offset}=(M-m-1)\cdot N_c+m\cdot N_{c+1}$, where c is selected a set {0, 1, 2, 3}, c satisfies $N_c \le n_{CCE}^{S-PDCCH} < N_{c+1}$ or satisfies $N_c \le n_{CCE}^{R-PDCCH} < N_{c+1}$, and $N_c=\max\{0, \lfloor [N_{RB}^{DL}\cdot(N_{sc}^{RB}\cdot c-4)]/36 \rfloor\}$; or when a PUCCH corresponding to the first physical downlink control channel in the M subframes uses a block cross-interleaving mode and a cross-interleaving block size is $N_c$, determine the fourth offset by $N_{offset}=(M-m-1)\cdot N_c+m\cdot(c+1)\cdot N_c$, where c is selected from a set {0, 1, 2, 3}, c satisfies $c\cdot N_c \le n_{CCE}^{S-PDCCH}$ or satisfies $<c\cdot N_c \le n_{CCE}^{R-PDCCH}<(c+1)\cdot N_c$, and $N_c$ is a higher layer signaling configuration parameter;

where, M is greater than or equal to 1, m is a subframe number of a subframe that is among the M subframes and to which the first physical downlink control channel belongs, $N_{RB}^{DL}$ is downlink bandwidth configuration, $N_{sc}^{RB}$ is a resource block size in a frequency domain, $n_{CCE}^{S-PDCCH}$ is a serial number of the first CCE for an S-PDCCH to transmit the DCI, and $n_{CCE}^{R-PDCCH}$ is a serial number of the first CCE for an R-PDCCH to transmit the DCI.

Optionally, the offset may include a reference signal offset $N_{offset}^{RS}$, where the reference signal offset $N_{offset}^{RS}$ may be determined by an antenna port p of a UE-specific reference signal supporting S-PDCCH or R-PDCCH transmission. In an embodiment of the present invention, when the quantity of antenna ports of the UE-specific reference signal supporting the S-PDCCH or R-PDCCH transmission is equal to 1, where the antenna ports are allocated to the UE, the reference signal offset $N_{offset}^{RS}$ may be determined by the antenna port p. In another embodiment of the present invention, when the quantity of antenna ports of the UE-specific reference signal supporting the S-PDCCH or R-PDCCH transmission exceeds 1, where the antenna ports are allocated to the UE, the reference signal offset $N_{offset}^{RS}$ may also be determined by the antenna port p that is among the antenna ports of the UE-specific reference signal supporting the S-PDCCH or R-PDCCH transmission and whose antenna port number is the smallest.

Optionally, a method for determining the reference signal offset $N_{offset}^{RS}$ may be: $N_{offset}^{RS}=p-7$, where p can be selected from any one of the following sets: p∈{7}, p∈{7,8}, p∈{7,8,9,10}, and p∈{7,8,9,10,11,12,13,14}. For example, when the quantity of antenna ports of the UE-specific reference signal supporting the S-PDCCH or R-PDCCH transmission exceeds 1, where the antenna ports are allocated to the UE, the reference signal offset $N_{offset}^{RS}$ may be 7.

Optionally, the antenna port p of the UE-specific reference signals may be notified by the base station to the UE by sending signaling, where the information may be radio resource control RRC signaling, explicit physical layer signaling, or implicit physical layer signaling.

Optionally, in an FDD system, when the first physical downlink control channel does not use cross-interleaving, the offset includes the sum of a first offset and the reference signal offset $N_{offset}^{RS}$.

Optionally, in a TDD system, when the first physical downlink control channel does not use cross-interleaving, the offset includes the sum of the total quantity $N_{CCE,all}^{PDCCH}$ of CCEs of the PDCCH in M subframes, a second offset $N_{offset}$, and the reference signal offset $N_{offset}^{RS}$.

Optionally, in an FDD system, when the first physical downlink control channel uses cross-interleaving, the offset includes the sum of a third offset and the reference signal offset $N_{offset}^{RS}$.

Optionally, in a TDD system, when the first physical downlink control channel uses cross-interleaving, the offset includes the sum of the total quantity $N_{CCE,all}^{PDCCH}$ of CCEs of the PDCCH in M subframes, a fourth offset $N_{offset}$, and the reference signal offset $N_{offset}^{RS}$.

Optionally, the offset may include a reference signal offset $N_{offset}^{RS}$, where the reference signal offset $N_{offset}^{RS}$ may also be determined by a quasi-random sequence initialization parameter of a reference signal sequence supporting S-PDCCH or R-PDCCH transmission. In an embodiment of the present invention, the quasi-random sequence initialization parameter of the reference signal sequence supporting the S-PDCCH or R-PDCCH transmission includes X or $n_{SCID}$ in a quasi-random sequence initialization formula $c_{init}=(\lfloor n_s/2 \rfloor+1)\cdot(2X+1)\cdot 2^{16}+n_{SCID}$, that is, $N_{offset}^{RS}=n_{SCID}$ or $N_{offset}^{RS}=X \bmod K$. The mod here indicates a modulo operation; X may be a cell ID whose value is in a certain range, for example, it may be any value from 0 to 503; $n_{SCID}$ may be a scrambling ID whose value is in a certain range, for example, it may be 0 or 1; and K may be any value among values 2, 4, 8, and the like.

Optionally, the value of X or $n_{SCID}$ may be notified by the base station to the UE by sending signaling, where the information may be radio resource control RRC signaling, explicit physical layer signaling, or implicit physical layer signaling.

Optionally, in an FDD system, when the first physical downlink control channel does not use cross-interleaving, the offset includes the sum of a first offset and the reference signal offset $N_{offset}^{RS}$.

Optionally, in a TDD system, when the first physical downlink control channel does not use cross-interleaving, the offset includes the sum of the total quantity $N_{CCE,all}^{PDCCH}$ of CCEs of the PDCCH in M subframes, a second offset $N_{offset}$, and the reference signal offset $N_{offset}^{RS}$.

Optionally, in an FDD system, when the first physical downlink control channel uses cross-interleaving, the offset includes the sum of a third offset and the reference signal offset $N_{offset}^{RS}$.

Optionally, in a TDD system, when the first physical downlink control channel uses cross-interleaving, the offset includes the sum of the total quantity $N_{CCE,all}^{PDCCH}$ of CCEs of the PDCCH in M subframes, a fourth offset $N_{offset}$, and the reference signal offset $N_{offset}^{RS}$.

As can be seen from the foregoing technical solution provided in the present invention, according to the control channel resource allocation apparatus in this embodiment of the present invention, higher layer signaling may not be required to notify a resource of a PUCCH format 1a or 1b of each UE, thereby saving higher layer signaling. In addition, it may also be unnecessary to reserve a resource of a PUCCH format 1a or 1b for a UE, and the resource of the PUCCH format 1a or 1b is allocated only when scheduling is performed, that is, when a PDSCH indicated by an S-PDCCH or an R-PDCCH exists, so that the resource can be used efficiently.

Furthermore, because the offset and the PUCCH parameter $N_{PUCCH}^{(1)}$ are added, the PUCCH format 1a or 1b resource number corresponding to the first physical downlink control channel is an offset of a PUCCH format 1a or 1b resource number corresponding to the PDCCH. Specifically, a PUCCH format 1a or 1b resource set corresponding to the first physical downlink control channel follows a PUCCH format 1a or 1b resource set corresponding to the PDCCH, thereby avoiding a collision between a resource corresponding to the first physical downlink control channel and a resource corresponding to another PDCCH.

For the control channel resource allocation apparatus in this embodiment of the present invention and composition of the apparatus, reference may be made correspondingly to an action performed by the UE or the eNB in the control channel resource allocation method in the foregoing embodiment for understanding, and therefore no details are described herein again.

An embodiment of the present invention further provides a processor, configured to determine a VRB number corresponding to a first physical downlink control channel, or determine a serial number of the first CCE for a first physical downlink control channel to transmit DCI; and obtain, according to the VRB number corresponding to the first physical downlink control channel or the serial number of the first CCE for the first physical downlink control channel to transmit the DCI, an offset, and a PUCCH parameter, a PUCCH format 1a or 1b resource number corresponding to the first physical downlink control channel The processor may be connected to a memory, where the memory is configured to store information processed by the processor. For an action performed by the processor, reference may be made to content in the control channel resource allocation method provided in the foregoing embodiment, and therefore no details are described herein again. The processor may exist in a UE or a base station and is configured to allocate a control channel resource.

An embodiment of the present invention further provides a chip, where the chip is configured to allocate a control channel resource and the chip may include the foregoing processor.

In conclusion, according to the control channel resource allocation method and apparatus in the embodiments of the present invention, a serial number of a CCE of a PDCCH is obtained by using a CCE or a VRB of an S-PDCCH or by using a CCE or a VRB of an R-PDCCH, and then a PUCCH format 1a or 1b resource number corresponding to the S-PDCCH or the R-PDCCH is obtained by using the serial number of the CCE of the PDCCH.

An S-PDCCH is used as an example in the following to describe a control channel resource allocation method in an embodiment of the present invention.

Figure 3:
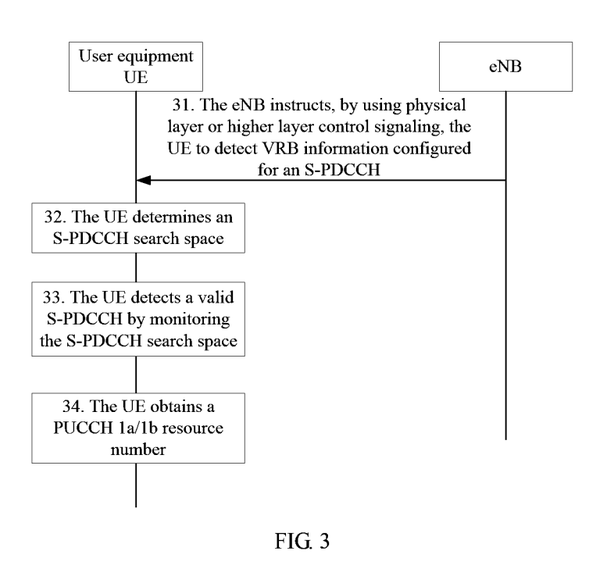
FIG. 3 is a schematic flowchart of an application scenario of a control channel resource allocation method according to an embodiment of the present invention.

In the control channel resource allocation method provided in the embodiment shown in FIG. 3, an S-PDCCH without cross-interleaving (Without cross-interleaving) in an FDD system is used for description.

Operations, such as multiplexing, scrambling, demodulation, layer mapping, precoding, and resource mapping are performed for the S-PDCC, like the PDCCH. An S-PDCCH is not limited to being mapped to a timeslot or a subframe.

31. An eNB instructs, by using physical layer control signaling or higher layer control signaling, a UE to detect VRB information configured for the S-PDCCH.

The VRB information may include configured consecutive VRB numbers $n_{VRB}^{R-PDCCH}=0,1,\ldots,N_{VRB}^{R-PDCCH}-1$ and the quantity $N_{VRB}^{R-PDCCH}$ of VRBs, so that when $n_{VRB}^{R-PDCCH}=0$, $n_{VRB}^{S-PDCCH}$ is the smallest $n_{VRB}$ in the configured VRBs, and when $n_{VRB}^{R-PDCCH}=N_{VRB}^{R-PDCCH}-1$, $n_{VRB}^{S-PDCCH}$ is the largest $n_{VRB}$ in the configured VRBs.

The physical layer control channel includes but is not limited to a PDCCH.

32. The UE determines an S-PDCCH search space.

The search space is a candidate set of a group of aggregation levels and corresponding S-PDCCHs at the aggregation levels.

The eNB selects an aggregation level of an S-PDCCH and a corresponding candidate (Table 3) according to a factor such as channel condition and maps the S-PDCCH to a corresponding VRB resource, where a serial number of the first VRB in the VRB resource is $N_{VRB}^{S-PDCCH}$. The eNB sends the S-PDCCH to the UE over the VRB resource.

The UE checks a valid S-PDCCH in the search space according to defined S-PDCCH aggregation levels 1, 2, 4 and 8.

That is to say, $n_{VRB}^{S-PDCCH}=(\Lambda \cdot m+i) \bmod N_{VRB}^{S-PDCCH}$, where $\Lambda$ is the aggregation level, $m=0,1,\ldots,M(\Lambda)-1$, $M(\Lambda)$ is the quantity of S-PDCCH candidates at each aggregation level, and $i=0,1,\ldots,\Lambda-1$, as shown in Table 3. The UE traverses values of $\Lambda$, i, and m, and the UE checks the valid S-PDCCH in the search space to obtain a corresponding $n_{VRB}^{S-PDCCH}$. The aggregation level here indicates the quantity of resource blocks mapped to the S-PDCCH.

TABLE 3

| Aggregation Level $\Lambda$ | Quantity $M(\Lambda)$ of S-PDCCH candidates |
|---|---|
| 1 | 6 |
| 2 | 6 |
| 4 | 2 |
| 8 | 2 |

For the foregoing steps 31 and 32, reference may be made to the prior art for understanding, and therefore no details are described herein again.

33. The UE detects the valid S-PDCCH by monitoring the S-PDCCH search space.

A position of a VRB of the S-PDCCH detected by the UE is $n_{VRB}^{S-PDCCH}$, the UE obtains $n_{CCE}$ of a PDCCH by using $n_{VRB}^{S-PDCCH}$, that is, $n_{CCE}=f(n_{VRB}^{S-PDCCH})$, and in the following, $N_{CCE}$ indicates the total quantity of CCEs of a PDCCH channel in one subframe in a system.

Multiple implementation manners exist for obtaining a mapping function $f(n_{VRB}^{S-PDCCH})$ of $n_{CCE}$ of the PDCCH by using $n_{VRB}^{S-PDCCH}$, which include but are not limited to the following several implementation manners:

If a base station is configured with only one group of VRBs, the mapping function includes but is not limited to:

(1) $n_{CCE}=f(n_{VRB}^{S-PDCCH})=n_{VRB}^{S-PDCCH}+N_{CCE}$, where $n_{VRB}^{S-PDCCH}$ is a VRB number of an S-PDCCH detected in $N_{VRB}^{S-PDCCH}$ VRB sets, which is from 0 to $N_{VRB}^{S-PDCCH}-1$, $n_{VRB}^{S-PDCCH}=0$ indicates the smallest virtual resource number $n_{VRB}$ in the configured VRBs, $n_{VRB}^{S-PDCCH}=N_{VRB}^{S-PDCCH}-1$ indicates the largest virtual resource number $n_{VRB}$ in the configured VRBs, and $N_{CCE}$ is described as above.

(2) $n_{CCE}=f(n_{VRB}^{S-PDCCH})=n_{VRB}^{S-PDCCH}+N_{S-PDCCH}^{(1)}$, where $n_{VRB}^{S-PDCCH}$ is as described in (1), $N_{S-PDCCH}^{(1)}$ indicates a resource allocation offset and is notified by higher layer signaling.

If the base station is configured with multiple groups of VRBs and $M_{VRB}^{S-PDCCH}$ VRBs are configured in total, the mapping function includes but is not limited to:

(3) $n_{CCE}=f(n_{VRB}^{S-PDCCH})=n_{VRB}^{S-PDCCH}+N_{CCE}$, where, $n_{VRB}^{S-PDCCH}$ is an S-PDCCH VRB number that is in $M_{VRB}^{S-PDCCH}$ VRBs in a total set, detected in a UE-specific VRB set, and from 0 to $M_{VRB}^{S-PDCCH}-1$, $n_{VRB}^{S-PDCCH}=0$ indicates the smallest virtual resource number $n_{VRB}$ in the configured VRBs, $n_{VRB}^{S-PDCCH}=M_{VRB}^{S-PDCCH}-1$ indicates the largest virtual resource number $n_{VRB}$ in the configured VRBs, and $N_{CCE}$ is described as above.

(4) $n_{CCE}=f(n_{VRB}^{S-PDCCH})=n_{VRB}^{S-PDCCH}+N_{S-PDCCH}^{(1)}$, where $n_{VRB}^{S-PDCCH}$ is as described in (3), $N_{S-PDCCH}^{(1)}$ indicates a resource allocation offset and is notified by higher layer signaling or notified to the UE by physical layer signaling.

(5) $n_{CCE}=f(n_{VRB}^{S-PDCCH})=n_{VRB}^{S-PDCCH}+N_{CCE}+p-7$, where $n_{VRB}^{S-PCCH}$ and $N_{CCE}$ are described as above, and p is an antenna port of UE-specific reference signal supporting S-PDCCH transmission. The antenna port p of the UE-specific reference signals may be notified by the base station to the UE by physical layer signaling or higher layer signaling. When the quantity of antenna ports of the UE-specific reference signal supporting the S-PDCCH transmission exceeds 1, where the antenna ports are allocated to the UE, the reference signal offset $N_{offset}^{RS}$ may be determined by the antenna port p that is among the antenna ports of the UE-specific reference signal supporting the S-PDCCH transmission and whose antenna port number is the smallest.

(6) $n_{CCE}=f(n_{VRB}^{S-PDCCH})=n_{VRB}^{S-PDCCH}+N_{CCE}+n_{SCID}$, or $n_{CCE}=f(n_{VRB}^{S-PDCCH})=n_{VRB}^{S-PDCCH}+N_{CCE}+X \bmod K$, where $n_{SCID}$, X, and K are described as above.

34. The UE obtains a PUCCH format 1a or 1b resource number according to $n_{CCE}$.

The foregoing (1) is used as an example to obtain the PUCCH format 1a or 1b resource number, and a case in which a serving cell is configured is used as an example. A case of multiple serving cells is similar. The cases (2)-(6) are similar, and therefore no details are provided again.

For transmission through a single antenna port, the UE obtains the PUCCH format 1a or 1b resource number $n_{PUCCH}^{(1,\tilde{p})}$ by using $n_{CCE}$, that is, a resource number over the antenna port $p^0$ is obtained by $n_{PUCCH}^{(1,p=p_0)}=n_{CCE}+N_{PUCCH}^{(1)}=n_{VRB}^{S-PDCCH}+N_{CCE}+N_{PUCCH}^{(1)}$; and for transmission through two antenna ports, a resource number over the antenna port $p_1$ is obtained by $n_{PUCCH}^{(1,p=p_1)}=n_{CCE}+1+N_{PUCCH}^{(1)}=n_{VRB}^{S-PDCCH}+N_{CCE}+1+N_{PUCCH}^{(1)}$.

Alternatively, steps 33 and 34 can be merged as one step, that is, according to 34, an offset is performed for a virtual resource block number $n_{VRB}^{S-PDCCH}$ of the S-PDCCH channel to obtain, through mapping, the resource of the PUCCH format 1a or 1b.

The foregoing (1) is used as an example to obtain a PUCCH 1a or 1b resource number.

An offset $N_{CCE}$ is performed for a virtual resource block number $n_{VRB}^{S-PDCCH}$ of the S-PDCCH channel to obtain, through mapping, the resource of the PUCCH format 1a or 1b, so that a cell-specific resource set mapped on the S-PDCCH is concatenated following a cell-specific resource of the PUCCH format 1a or 1b mapped on the PDCCH, that is, for a single antenna port, $n_{PUCCH}^{(1,p=p_0)}=n_{VRB}^{S-PDCCH}+N_{CCE}+N_{PUCCH}^{(1)}$, and for two antenna ports, $n_{PUCCH}^{(1,p=p_1)}=n_{VRB}^{S-PDCCH}+N_{CCE}+1+N_{PUCCH}^{(1)}$.

Though an executor of 32-34 in this embodiment is a UE, the UE determines a physical uplink control channel PUCCH format 1a or 1b resource number according to the control channel resource allocation method in this embodiment of the present invention and sends an HARQ-ACK over the resource. A person skilled in the art may understand that, an eNB may determine, according to the control channel resource allocation method in this embodiment of the present invention, a physical uplink control channel PUCCH format 1a or 1b resource number corresponding to the UE, and receive, over a corresponding resource, an HARQ-ACK sent by the corresponding UE.

Figure 4:
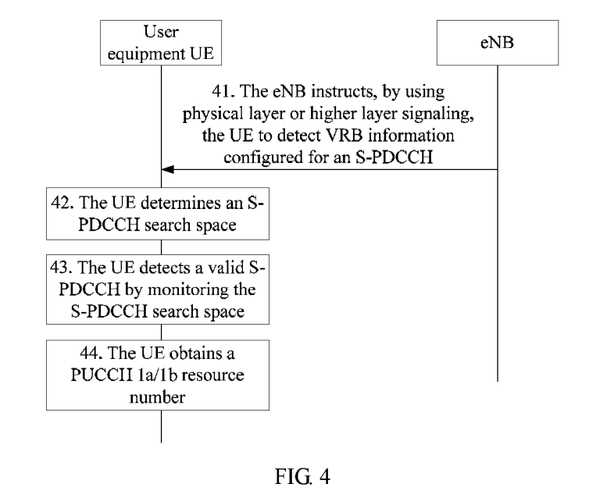
FIG. 4 is a schematic flowchart of an application scenario of a control channel resource allocation method according to an embodiment of the present invention.

A case of an S-PDCCH with cross-interleaving (With cross-interleaving) in an FDD system is shown in FIG. 4.

Operations, such as PDCCH multiplexing, scrambling, demodulation, layer mapping, precoding, and resource mapping are performed for the S-PDCCH.

41. An eNB instructs, by using physical layer or higher layer control signaling, a UE to detect VRB information configured for the S-PDCCH.

The VRB information includes a VRB number in a system bandwidth and the quantity $N_{VRB}^{S-PDCCH}$ of VRBs.

The physical layer control signaling includes but is not limited to a PDCCH.

42. The UE determines a search space allocated to the S-PDCCH channel.

The search space is a candidate set of a group of aggregation levels and corresponding S-PDCCHs at the aggregation levels.

The eNB selects an aggregation level of an S-PDCCH and a corresponding candidate set according to a factor such as channel condition and maps the S-PDCCH to a corresponding CCE resource, where a position of the first CCE in the CCE resource is $n_{CCE}^{S-PDCCH}$. The eNB sends the S-PDCCH to the UE over the CCE resource.

Correspondingly, the S-PDCCH follows defined aggregation levels 1, 2, 4, and 8, and the UE checks a valid S-PDCCH in the search space.

In the $j^{th}$ timeslot $j \in \{0,1\}$ and the $n^{th}$ subframe, the search space is $\Lambda \cdot \{(Y_n+m) \bmod \lfloor N_{CCE,j}^{S-PDCCH}/\Lambda \rfloor\} + i$, where $i=0,1,\ldots,\Lambda-1$, $\Lambda$ is the aggregation level, $m=0,1,\ldots,M(\Lambda)-1$, and $m(\Lambda)$ is the quantity of S-PDCCH candidates at each aggregation level. The UE traverses values of $\Lambda$, i, and m, and the UE checks the valid S-PDCCH in the search space to obtain a corresponding $n_{CCE}^{S-PDCCH}$. The aggregation level here indicates the quantity of CCEs mapped to the S-PDCCH. For correspondence between $\Lambda$ and $M(\Lambda)$, refer to Table 3, $Y_n$ is a numerical value calculated by the UE according to an RNTI (Radio Network Temporary Identity, radio network temporary identity).

For the foregoing steps 41 and 42, reference may be made to the prior art for understanding, and therefore no details are described herein again.

43. The UE detects the valid S-PDCCH by monitoring the S-PDCCH search space.

A position of the S-PDCCH detected by the UE is $n_{CCE}^{S-PDCCH}$, and the UE obtains $n_{CCE}$ of a PDCCH by using $n_{CCE}^{S-PDCCH}$, that is, $n_{CCE}=f(n_{CCE}^{S-PDCCH})$.

Multiple implementation manners exist for obtaining a mapping function $f(n_{CCE}^{S-PDCCH})$ of $n_{CCE}$ of the PDCCH by the UE by using $n_{CCE}^{S-PCDDH}$, which include but are not limited to the following several implementation manners:

If a base station is configured with only one group of VRBs, the mapping function includes but is not limited to:

(6) $n_{CCE}=f(n_{CCC}^{S-PDCCH})=n_{CCE}^{S-PDCCH}+N_{CCE}$, where $n_{CCE}^{S-PDCCH}$ is an S-PDCCH CCE number detected in a UE-specific CCE set $N_{CCE,j}^{S-PDCCH}$.

(7) $n_{CCE}=f(n_{CCE}^{S-PDCCH})=n_{CCE}^{S-PDCCH}+N_{S-PDCCH}^{(1)}$, where $n_{CCE}^{S-PDCCH}$ is a serial number of corresponding CCE in $N_{CCE,j}^{S-PDCCH}$, $N_{S-PDCCH}^{(1)}$ indicates a resource allocation offset and is notified to the UE by higher layer signaling or physical layer signaling.

If the base station is configured with multiple groups of VRBs, each group of VRBs includes $N_{CCE,j}^{S-PDCCH}$ CCEs, and $N_{CCE,all}^{S-PDCCH}$ CCEs (equal to the sum of the quantities of CCEs in the multiple groups) are included in total, the mapping function includes but is not limited to:

(8) $n_{CCE}=f(n_{CCE}^{S-PDCCH})=n_{CCE}^{S-PDCCH}+N_{CCE}$, where, $n_{CCE}^{S-PDCCH}$ is an S-PDCCH CCE number that is in $N_{CCE,ALL}^{S-PDCCH}$ CCEs in a total set, detected in the UE-specific CCE set, and from 0 to $N_{CCE,ALL}^{S-PDCCH}-1$, $n_{CCE}^{S-PDCCH}=0$ indicates the smallest virtual resource number $n_{CCE}$ in configured $N_{CCE,ALL}^{S-PDCCH}$ CCEs, $n_{CCE}^{S-PDCCH}=N_{CCE,ALL}^{S-PDCCH}-1$ indicates the largest virtual resource number $n_{CCE}$ in the configured $N_{CCE,ALL}^{S-PDCCH}$ CCEs, and $N_{CCE}$ is described as above.

(9) $n_{CCE}=f(n_{CCE}^{S-PDCCH})=n_{CCE}^{S-PDCCH}+N_{S-PDCCH}^{(1)}$, where $n_{CCE}^{S-PDCCH}$ is as described in example (7), $N_{S-PDCCH}^{(1)}$ indicates a UE-specific resource allocation offset, which is notified to the UE by higher layer signaling or physical layer signaling and ensures that no collision between CCE numbers corresponding to multiple groups of S-PDCCH resources exists.

(10) $n_{CCE}=f(n_{CCE}^{S-PDCCH})=n_{CCE}^{S-PDCCH}+N_{CCE}+p-7$, where $n_{VRB}^{S-PDCCH}$ and $N_{CCE}$ are described as above, and p is an antenna port of UE-specific reference signal supporting S-PDCCH transmission. The antenna port p of the UE-specific reference signals may be notified by the base station to the UE by physical layer signaling or higher layer signaling. When the quantity of antenna ports of the UE-specific reference signal supporting the S-PDCCH transmission exceeds 1, where the antenna ports are allocated to the UE, the reference signal offset $N_{offset}^{RS}$ may be determined by the antenna port p that is among the antenna ports of the UE-specific reference signal supporting the S-PDCCH transmission and whose antenna port number is the smallest.

(11) $n_{CCE}=f(n_{VRB}^{S-PDCCH})=n_{VRB}^{S-PDCCH}+N_{CCE}+n_{SCID}$ or $n_{CCE}=f(n_{VRB}^{S-PDCCH})=n_{VRB}^{S-PDCCH}+N_{CCE}+X \bmod K$, where $n_{SCID}$, X, and K are described as above.

44. The UE obtains a PUCCH format 1a or 1b resource number according to $n_{CCE}$.

The foregoing (6) is used as an example to obtain a PUCCH resource number, and a case in which a serving cell is configured is used as an example. A case of multiple serving cells is similar. The cases (7)-(11) are similar, and therefore no details are provided again.

For transmission through a single antenna port, the UE obtains the PUCCH format 1a or 1b resource number $n_{PUCCH}^{(1,\tilde{p})}$ by using $n_{CCE}$, that is, a resource number over the antenna port $p_0$ is obtained by $n_{PUCCH}^{(1,p=p_0)}=n_{CCE}+N_{PUCCH}^{(1)}=n_{CCE}^{S-PDCCH}+N_{CCE}+N_{PUCCH}^{(1)}$; and for transmission through two antenna ports, a resource number over the antenna port $p_1$ is obtained by $n_{PUCCH}^{(1,p=p_1)}=n_{CCE}+1+N_{PUCCH}^{(1)}=n_{CCE}^{S-PDCCH}+N_{CCE}+1+N_{PUCCH}^{(1)}$. port $p^1$ is obtained by Alternatively, steps 43 and 44 can be merged as one step, that is, according to 44, an offset is performed for $n_{CCE}^{PDCCH}$ of the S-PDCCH channel to obtain, through mapping, the resource of the PUCCH format 1a or 1b.

An offset $N_{CCE}$ is performed for $n_{CCE}^{S-PDCCH}$ of the S-PDCCH channel to obtain, through mapping, the resource of the PUCCH format 1a or 1b, so that a cell-specific resource set mapped on the S-PDCCH is concatenated following a cell-specific resource of the PUCCH format 1a or 1b mapped on the PDCCH, that is, for a single antenna port, $n_{PUCCH}^{(1,p=p_0)}=n_{CCE}^{S-PDCCH}+N_{CCE}+N_{PUCCH}^{(1)}$, and for two antenna ports, $n_{PUCCH}^{(1,p=p_1)}=n_{CCE}^{S-PDCCH}+N_{CCE}+1+N_{PUCCH}^{(1)}$.

Though an executor of 42-44 in this embodiment is a UE, the UE determines a physical uplink control channel PUCCH format 1a or 1b resource number according to the control channel resource allocation method in this embodiment of the present invention and sends an HARQ-ACK over the resource.

A person skilled in the art may understand that, an eNB may determine, according to the control channel resource allocation method in this embodiment of the present invention, a physical uplink control channel PUCCH format 1a or 1b resource number corresponding to the UE, and receive, over a corresponding resource, an HARQ-ACK sent by the corresponding UE.

Figure 5:
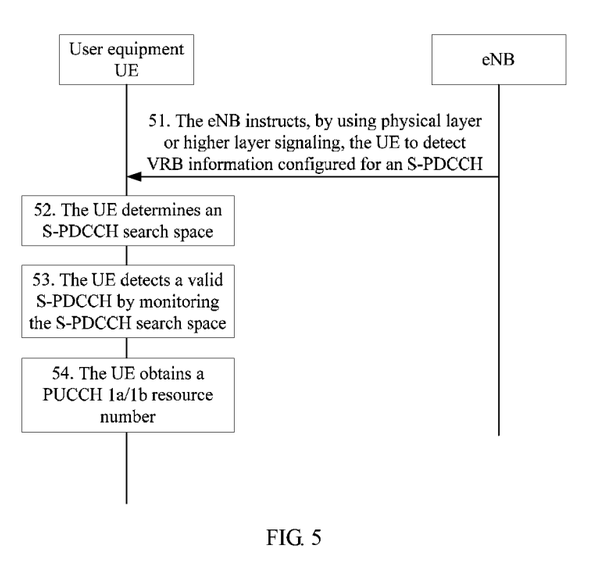
FIG. 5 is a schematic flowchart of an application scenario of a control channel resource allocation method according to an embodiment of the present invention.

A case of an S-PDCCH without cross-interleaving in a TDD system is shown in FIG. 5.

Operations, such as multiplexing, scrambling, demodulation, layer mapping, precoding, and resource mapping are performed for the S-PDCCH.

51. An eNB instructs, by using physical layer or higher layer control signaling, a UE to detect VRB information configured for the S-PDCCH.

52. The UE determines a search space allocated to the S-PDCCH channel

For steps 51 and 52, reference may be made to steps 31 and 32 in the embodiment shown in FIG. 3, and therefore no details are described herein.

53. The UE detects a valid S-PDCCH by monitoring the S-PDCCH search space.

A position of the S-PDCCH detected by the UE is $n_{VRB}^{S-PDCCH}$, and the UE obtains $n_{CCE}$ of a PDCCH by using $n_{VRB}^{S-PDCCH}$, that is, $n_{CCE} = f(n_{VRB}^{S-PDCCH})$.

Multiple implementation manners exist for obtaining a mapping function $f(n_{VRB}^{S-PDCCH})$ of $n_{CCE}$ of the PDCCH by the UE by sing $n_{VRB}^{S-PDCCH}$, which include but are not limited to the following several implementation manners:

(1) $f(n_{VRB}^{S-PDCCH}) = n_{VRB}^{S-PDCCH} + N_{offset} + N_{CCE,all}^{PDCCH}$, where $N_{offset}$ may be obtained by using the following multiple manners.

When a PUCCH resource corresponding to the S-PDCCH in at least one subframe uses a block cross-interleaving mode, a cross-interleaving block size is $N_c$, and $N_c$ is the quantity of CCEs in an OFDM symbol, $N_{offset} = (M-m-1) \cdot N_c + m \cdot N_{c+1}$, where c is selected from a set $\{0, 1, 2, 3\}$ and satisfies $N_c \leq n_{VRB}^{S-PDCCH} < N_{c+1}$, and $N_c = \max\{0, \lfloor [N_{RB}^{DL} \cdot (N_{sc}^{RB} \cdot c - 4)]/36 \rfloor\}$.

A value of M may be understood through Table 2, and therefore no details are described herein again.

When a PUCCH resource corresponding to at least one inner S-PDCCH uses a block cross-interleaving mode, and a cross-interleaving block size is a numerical value configured at a higher layer, $N_{offset} = M-m-1) \cdot c \cdot N_c + m \cdot (c+1) \cdot N_c$, where c is selected from a set $\{0, 1, 2, 3\}$ and satisfies $c \cdot N_c \leq n_{VRB}^{S-PDCCH} < (c+1) \cdot N_c$, and $N_c$ is a value of a cross-interleaving block size configured at a higher layer.

M is a size of a downlink subframe set that needs to feed back, in the uplink subframe, an HARQ, and m is a subframe number of a subframe in which an S-PDCCH in the subframe set is located. $N_{CCE,all}^{PDCCH}$ indicates the total quantity of CCEs that is corresponding to all PDCCH channels in the downlink subframe set, that is, $N_{CCE,all}^{PDCCH} = M \cdot N_{CCE,max}^{PDCCH}$, $N_{CCE,max}^{PDCCH}$ here indicates the quantity of CCEs that is corresponding to the maximum PCFICH value acquired by the UE from the set. The foregoing two formulas $N_{offset} = (M-m-1) \cdot c \cdot N_c + m \cdot (c+1) \cdot N_c$ and $N_{CCE,all}^{PDCCH} = M \cdot N_{CCE,max}^{PDCCH}$ are merged to obtain:

$$n_{CCE} = n_{VRB}^{S-PDCCH} + N_{offset} + N_{CCE,all}^{PDCCH}.$$

(2) $n_{CCE} = f(n_{VRB}^{S-PDCCH}) = n_{VRB}^{S-PDCCH} + N_{offset} + N_{CCE,all}^{PDCCH} + p - 7$, where $n_{VRB}^{S-PDCCH}$, $N_{offset}$, and $N_{CCE,all}^{PDCCH}$ are described as above, and p is an antenna port of UE-specific reference signal supporting S-PDCCH transmission. The antenna port p of the UE-specific reference signals may be notified by the base station to the UE by physical layer signaling or higher layer signaling. When the quantity of antenna ports of the UE-specific reference signal supporting the S-PDCCH transmission exceeds 1, where the antenna ports are allocated to the UE, the reference signal offset $N_{offset}^{RS}$ (may be determined by the antenna port p that is among the antenna ports of the UE-specific reference signal supporting the S-PDCCH transmission and whose antenna port number is the smallest.

(3) $n_{CCE} = f(n_{VRB}^{S-PDCCH}) = n_{VRB}^{S-PDCCH} + N_{offset} + N_{CCE,all}^{PDCCH} + n_{SCID}$, or $n_{CCE} = f(n_{VRB}^{S-PDCCH}) = n_{VRB}^{S-PDCCH} + N_{offset} + N_{CCE,all}^{PDCCH} + X$ mod K, where $n_{SCID}$, X, and K are described as above.

54. The UE obtains a PUCCH format 1a or 1b resource number according to $n_{CCE}$.

The foregoing (1) is used as an example to obtain a PUCCH resource number. Other cases are similar, and therefore no details are described again.

In the case in which a serving cell is configured, HARQ-ACK binding and multiplexing cases are classified. The HARQ-ACK binding case is used for description here, and the present invention includes but is not limited to the HARQ-ACK binding case.

For detection of PDSCH transmission indicated by a corresponding PDCCH or downlink semi-persistent scheduling (semi-persistent scheduling, SPS) release indicated by a PDCCH, the UE obtains the PUCCH format 1a or 1b resource number by using $n_{CCE}$, that is, for antenna port 0, the PUCCH format 1a or 1b resource number is obtained by $n_{PUCCH}^{(1,\tilde{p}=p_0)} = n_{VRB}^{S-PDCCH} + N_{offset} + N_{CCE,all}^{PDCCH} + N_{PUCCH}^{(1)}$; and for antenna port 1, the PUCCH format 1a or 1b resource number is obtained by $n_{PUCCH}^{(1,\tilde{p}=p_1)} = n_{VRB}^{S-PDCCH} + N_{offset} + N_{CCE,all}^{PDCCH} + 1 + N_{PUCCH}^{(1)}$.

Alternatively, steps 53 and 54 can be merged as one step, that is, according to 54, an offset $N_{offset} + N_{CCE,all}^{PDCCH}$ is performed for a virtual resource block number $n_{VRB}^{S-PDCCH}$ of the S-PDCCH channel to obtain, through mapping, the resource of the PUCCH format 1a or 1b, so that a cell-specific resource set mapped on the S-PDCCH is concatenated following a cell-specific resource of the PUCCH format 1a or 1b mapped on the PDCCH, that is, for a single antenna port, $n_{PUCCH}^{(1,\tilde{p}=p_0)} = n_{VRB}^{S-PDCCH} + N_{offset} + N_{CCE,all}^{PDCCH} + N_{PUCCH}^{(1)}$, and for two antenna ports, $n_{PUCCH}^{(1,\tilde{p}=p_1)} = n_{VRB}^{S-PDCCH} + N_{offset} + N_{CCE,all}^{PDCCH} + 1 + N_{PUCCH}^{(1)}$.

Though an executor of 52-54 in this embodiment is a UE, the UE determines a physical uplink control channel PUCCH format 1a or 1b resource number according to the control channel resource allocation method in this embodiment of the present invention and sends an HARQ-ACK over the resource. A person skilled in the art may understand that, an eNB may determine, according to the control channel resource allocation method in this embodiment of the present invention, a physical uplink control channel PUCCH format 1a or 1b resource number corresponding to the UE, and receive, over a corresponding resource, an HARQ-ACK sent by the corresponding UE.

Figure 6:
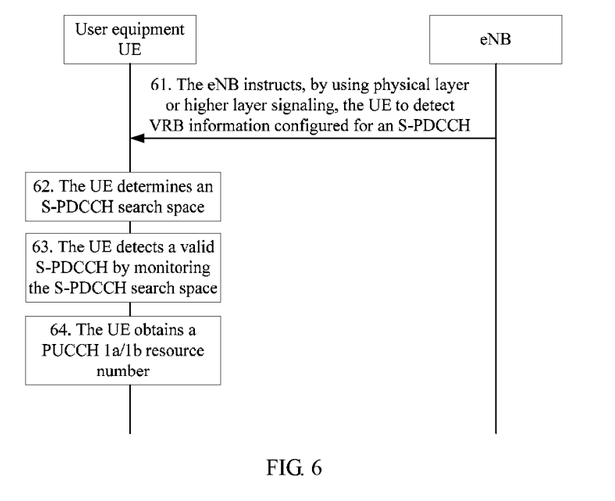
FIG. 6 is a schematic flowchart of an application scenario of a control channel resource allocation method according to an embodiment of the present invention.

A case of an S-PDCCH with cross-interleaving in a TDD system is shown in FIG. 6.

Operations, such as multiplexing, scrambling, demodulation, layer mapping, precoding, and resource mapping, are performed for the S-PDCCH according to the current similar manner of a PDCCH.

61. An eNB instructs, by using physical layer or higher layer control signaling, a UE to detect VRB information configured for the S-PDCCH.

62. The UE determines a search space allocated to the S-PDCCH channel

For steps 61 and 62, reference may be made to steps 41 and 42 in the embodiment shown in FIG. 4, and therefore no details are described herein.

63. The UE detects a valid S-PDCCH by monitoring the S-PDCCH search space.

A position of the S-PDCCH detected by the UE is $n_{CCE}^{S-PDCCH}$, and the UE obtains $n_{CCE}$ of a PDCCH by using $n_{CCE}^{S-PDCCH}$, that is, $n_{CCE} = f(n_{CCE}^{S-PDCCH})$, Multiple implementation manners exist for obtaining a mapping function $f(n_{CCE}^{S-PDCCH})$ of $n_{CCE}$ of the PDCCH by the UE by using $n_{CCE}^{S\text{-}PDCCH}$, which include but are not limited to the following several implementation manners:

(1) $f(n_{CCE}^{S\text{-}PDDCH}) = n_{CCE}^{S\text{-}PDCCH} + N_{offset} + N_{CCE,all}^{PDCCH}$, where $N_{offset}$ may be obtained by using the following multiple manners:

When a PUCCH resource corresponding to at least one inner S-PDCCH does not use a block cross-interleaving mode, $N_{offset} = m \cdot N_{CCE,max}^{S\text{-}PDCCH}$, where $N_{CCE,max}^{S\text{-}PDCCH}$ is the total quantity of CCE resources corresponding to all S-PDCCHs in a subframe to which a first physical downlink control channel belongs.

When a PUCCH resource corresponding to at least one inner S-PDCCH uses a block cross-interleaving mode, a cross-interleaving block size is $N_c$, and $N_c$ is the quantity of CCEs in an OFDM symbol, $N_{offset} = (M-m-1) \cdot N_c + m \cdot N_{c+1}$, where c is selected from a set {0, 1, 2, 3} and satisfies $N_c \leq n_{CCE}^{S\text{-}PDCCH} < N_{c+1}$, and $N_c = \max\{0, \lfloor N_{RB}^{DL} \cdot (N_{sc}^{RB} \cdot c - 4) \rfloor / 36 \rfloor\}$.

When a PUCCH resource corresponding to at least one inner S-PDCCH uses a block cross-interleaving mode, and a cross-interleaving block size is a numerical value configured at a higher layer, $N_{offset} = (M-m-1) \cdot c \cdot N_c + m \cdot (c+1) \cdot N_c$, where c is selected from a set {0, 1, 2, 3} and satisfies $c \cdot N_c \leq n_{CCE}^{S\text{-}PDCCH} < (c+1) \cdot N_c$, and $N_c$ is a value of a cross-interleaving block size configured at a higher layer.

M is a size of a downlink subframe set that needs to feed back, in the uplink subframe, an HARQ, and m is a subframe number of a subframe in which an S-PDCCH in the subframe set is located. $N_{CCE,all}^{PDCCH}$ indicates the total quantity of CCEs that is corresponding to all PDCCH channels in the downlink subframe set, that is, $N_{CCE,all}^{PDCCH} = M \cdot N_{CCE,max}^{PDCCH}$, $N_{CCE,max}^{PDCCH}$ here indicates the quantity of CCEs that is corresponding to the maximum PCFICH value acquired by the UE from the set. $N_{offset} = (M-m-1) \cdot c \cdot N_c + m \cdot (c+1) \cdot N_c$ and $N_{CCE,all}^{PDCCH} = M \cdot N_{CCE,max}^{PDCCH}$ are merged to obtain:

$$n_{CCE} = N_{offset} + n_{CCE}^{S\text{-}PDCCH} + N_{CCE,all}^{PDCCH}.$$

(2) $n_{CCE} = f(n_{CCE}^{S\text{-}PDCCH}) = n_{CCE}^{S\text{-}PDCCH} + N_{offset} + N_{CCE,all}^{PDCCH} + p - 7$, where $n_{VRB}^{S\text{-}PDCCH}$, $N_{offset}$ and $N_{CCE,all}^{PDCCH}$ are described as above, and p is an antenna port of UE-specific reference signal supporting S-PDCCH transmission. The antenna port p of the UE-specific reference signals may be notified by the base station to the UE by physical layer signaling or higher layer signaling. When the quantity of antenna ports of the UE-specific reference signal supporting the S-PDCCH transmission exceeds 1, where the antenna ports are allocated to the UE, the reference signal offset $N_{offset}^{RS}$ may be determined by the antenna port p that is among the antenna ports of the UE-specific reference signal supporting the S-PDCCH transmission and whose antenna port number is the smallest.

(3) $n_{CCE} = f(n_{VRB}^{S\text{-}PDCCH}) = n_{VRB}^{S\text{-}PDCCH} + N_{offset} + N_{CCE,all}^{PDCCH} + n_{SCID}$, or $n_{CCE} = f(n_{VRB}^{S\text{-}PDCCH}) = n_{VRB}^{S\text{-}PDCCH} + N_{offset} + N_{CCE,all}^{PDCCH} + X \mod K$, where $n_{SCID}$, X, and K are described as above.

64. The UE obtains a PUCCH format 1a or 1b resource number according to $n_{CCE}$.

The foregoing (1) is used as an example to obtain a PUCCH resource number. Other cases are similar, and therefore no details are described again.

In the case in which a serving cell is configured, HARQ-ACK binding and multiplexing cases are classified. The HARQ-ACK binding case is used for description here, and the present invention includes but is not limited to the HARQ-ACK binding case.

For detection of PDSCH transmission indicated by a corresponding PDCCH or downlink SPS release indicated by a PDCCH, the UE obtains the PUCCH format 1a or 1b resource number by using $n_{CCE}$, that is, for antenna port 0, the PUCCH format 1a or 1b resource number is obtained by $n_{PUCCH}^{(1,p=p_0)} = n_{CCE}^{S\text{-}PDCCH} + N_{offset} + N_{CCE,all}^{PDCCH} + N_{PUCCH}^{(1)}$, and for antenna port 1, the PUCCH format 1a or 1b resource number is obtained by $n_{PUCCH}^{(1,p=p_0)} = n_{CCE}^{S\text{-}PDCCH} + N_{offset} + N_{CCE,all}^{PDCCH} + 1 + N_{PUCCH}^{(1)}$.

Alternatively, steps 63 and 64 can be merged as one step, that is, according to 64, an offset $N_{offset} + N_{CCE,all}^{PDCCH}$ is performed for a virtual resource block number $n_{CCE}^{S\text{-}PDCCH}$ of the S-PDCCH channel according to a TDD mechanism to obtain, through mapping, the resource of the PUCCH format 1a or 1b, so that a cell-specific resource set mapped on the S-PDCCH is concatenated following a cell-specific resource of the PUCCH format 1a or 1b mapped on the PDCCH, that is, for a single antenna port, $n_{PUCCH}^{(1,p=p_0)} = n_{CCE}^{S\text{-}PDCCH} + N_{offset} + N_{CCE,all}^{PDCCH} + N_{PUCCH}^{(1)}$, and for two antenna ports, $n_{PUCCH}^{(1,p=p_1)} = n_{CCE}^{S\text{-}PDCCH} + N_{offset} + N_{CCE,all}^{PDCCH} + 1 + N_{PUCCH}^{(1)}$.

Though an executor of 62-6 in this embodiment is a UE, the UE determines a physical uplink control channel PUCCH format 1a or 1b resource number according to the control channel resource allocation method in this embodiment of the present invention and sends an HARQ-ACK over the resource. A person skilled in the art may understand that, an eNB may determine, according to the control channel resource allocation method in this embodiment of the present invention, a physical uplink control channel PUCCH format 1a or 1b resource number corresponding to the UE, and receive, over a corresponding resource, an HARQ-ACK sent by the corresponding UE.

The foregoing descriptions are merely specific exemplary embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

A person of ordinary skill in the art may understand that, all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), a random access memory (Random Access Memory, RAM), or the like.

What is claimed is:

1. A control channel resource allocation method for a time division duplexing (TDD) system, the method comprising:
    determining, by a processor, a virtual resource block (VRB) number corresponding to a first physical downlink control channel (PDCCH), wherein the first PDCCH comprises: a secondary physical downlink control channel (S-PDCCH) or a relay physical downlink control channel (R-PDCCH); and
    obtaining, by the processor, according to the VRB number, an offset and a physical uplink control channel (PUCCH) parameter, a PUCCH format 1a or 1b resource number corresponding to the first PDCCH;
    wherein obtaining the PUCCH format 1a or 1b resource number corresponding to the first PDCCH further comprises adding the offset to the VRB number and then adding the PUCCH parameter;
wherein the first PDCCH does not use cross-interleaving;
wherein the offset comprises the sum of the total quantity $N_{CCE,all}^{PDCCH}$ of control channel elements (CCEs) of the first PDCCH in M subframes and a second offset $N_{offset}$, wherein the M subframes are downlink subframes corresponding to uplink subframes for feeding back a positive acknowledgement (ACK) or a negative acknowledgement (NACK), and M is an integer greater than or equal to 1.

2. The method according to claim 1, wherein: the offset comprises a reference signal offset $N_{offset}^{RS}$, wherein the reference signal offset $N_{offset}^{RS}$ is determined by an antenna port p of a user equipment (UE)-specific reference signal supporting the S-PDCCH or R-PDCCH transmission.

3. The method according to claim 2, wherein $N_{offset}^{RS}$=p−7, wherein p is selected from any one of the following sets:
p∈{7};
p∈{7,8};
p∈{7,8,9,10}; and
p∈{17,8,9,10,11,12,13,14}.

4. The method according to claim 1, wherein the offset comprises a reference signal offset $N_{offset}^{RS}$, wherein the reference signal offset $N_{offset}^{RS}$ is determined by a quasi-random sequence initialization parameter of a reference signal sequence supporting S-PDCCH or R-PDCCH transmission.

5. The method according to claim 4, wherein the quasi-random sequence initialization parameter of the reference signal sequence supporting the S-PDCCH or R-PDCCH transmission comprises:
X or $n_{SCID}$ in a quasi-random sequence initialization formula $c_{init}=(\lfloor n_s/2 \rfloor+1)\cdot(2X+1)\cdot 2^{16}+n_{SCID}$, wherein X is a cell ID, $n_{SCID}$ is a scrambling ID, and $n_s$ is a slot number within a radio frame.

6. A control channel resource allocation method for a time division duplexing (TDD) system, the method comprising:
determining, by a processor, a serial number of a first control channel element (CCE) for the first physical downlink control channel (PDCCH), wherein the first PDCCH comprises a secondary physical downlink control channel (S-PDCCH) or a relay physical downlink control channel (R-PDCCH); and
obtaining, by the processor, according to the serial number, an offset and a physical uplink control channel (PUCCH) parameter, a PUCCH format 1a or 1b resource number corresponding to the first PDCCH;
wherein obtaining the PUCCH format 1a or 1b resource number corresponding to the first PDCCH further comprises adding the offset to the serial number of the first CCE and then adding the PUCCH parameter;
wherein the first PDCCH does not use cross-interleaving;
wherein the offset comprises the sum of the total quantity $N_{CCE,all}^{PDCCH}$ of control channel elements (CCEs) of the first PDCCH in M subframes and a fourth offset $N_{offset}$, wherein the M subframes are downlink subframes corresponding to uplink subframes for feeding back a positive acknowledgement (ACK) or a negative acknowledgement (NACK), and M is an integer greater than or equal to 1.

7. The method according to claim 6, wherein the offset comprises a reference signal offset $N_{offset}^{RS}$, and wherein the reference signal offset $N_{offset}^{RS}$ is determined by an antenna port p of user equipment (UE)-specific reference signal supporting the S-PDCCH or R-PDCCH transmission.

8. The method according to claim 7, wherein $N_{offset}^{RS}$=p−7, wherein p is selected from any one of the following sets:
p∈{7};
p∈{7,8};
p∈{7,8,9,10}; and
p∈{17,8,9,10,11,12,13,14}.

9. The method according to claim 6, wherein the offset comprises a reference signal offset $N_{offset}^{RS}$, and wherein the reference signal offset $N_{offset}^{RS}$ is determined by a quasi-random sequence initialization parameter of a reference signal sequence supporting S-PDCCH or R-PDCCH transmission.

10. The method according to claim 9, wherein the quasi-random sequence initialization parameter of the reference signal sequence supporting the S-PDCCH or R-PDCCH transmission comprises:
X or $n_{SCID}$ in a quasi-random sequence initialization formula $c_{init}=(\lfloor n_s/2 \rfloor+1)\cdot(2X+1)\cdot 2^{16}+n_{SCID}$, wherein X is a cell ID, $n_{SCID}$ is a scrambling ID, and $n_s$ is a slot number within a radio frame.

11. A control channel resource allocation method, comprising:
determining, by a processor, a virtual resource block (VRB) number corresponding to a first physical downlink control channel (PDCCH), wherein the first PDCCH comprises: a secondary physical downlink control channel (S-PDCCH) or a relay physical downlink control channel (R-PDCCH); and
obtaining, by the processor, a PUCCH format 1a or 1b resource number corresponding to the first PDCCH according to the VRB number, an offset and a physical uplink control channel (PUCCH) parameter;
wherein the offset comprises a reference signal offset $N_{offset}^{RS}$, wherein the reference signal offset $N_{offset}^{RS}$ is determined by an antenna port p of a user equipment (UE)-specific reference signal supporting the S-PDCCH or R-PDCCH transmission; and
wherein $N_{offset}^{RS}$=p−7, wherein p is selected from any one of the following sets:
p∈{7};
p∈{7,8};
p∈{7,8,9,10}; and
p∈{17,8,9,10,11,12,13,14}.

12. A control channel resource allocation method, comprising:
determining, by a processor, a virtual resource block (VRB) number corresponding to a first physical downlink control channel (PDCCH), wherein the first PDCCH comprises: a secondary physical downlink control channel (S-PDCCH) or a relay physical downlink control channel (R-PDCCH); and
obtaining, by the processor, a PUCCH format 1a or 1b resource number corresponding to the first PDCCH according to the VRB number, an offset and a physical uplink control channel (PUCCH) parameter;
wherein the offset comprises a reference signal offset $N_{offset}^{RS}$, wherein the reference signal offset $N_{offset}^{RS}$ is determined by a quasi-random sequence initialization parameter of a reference signal sequence supporting S-PDCCH or R-PDCCH transmission; and
wherein the quasi-random sequence initialization parameter of the reference signal sequence supporting the S-PDCCH or R-PDCCH transmission comprises:
X or $n_{SCID}$ in a quasi-random sequence initialization formula $c_{init}=(\lfloor n_s/2 \rfloor+1)\cdot(2X+1)\cdot 2^{16}+n_{SCID}$, wherein X is a cell ID, $n_{SCID}$ is a scrambling ID, and $n_s$ is a slot number within a radio frame.

* * * * *